(12) United States Patent
Li

(10) Patent No.: US 12,218,937 B2
(45) Date of Patent: Feb. 4, 2025

(54) PACKET PROCESSING METHOD AND APPARATUS, DEVICE, AND COMPUTER-READABLE STORAGE MEDIUM

(71) Applicant: Huawei Technologies Co., Ltd., Shenzhen (CN)

(72) Inventor: Shiguang Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 386 days.

(21) Appl. No.: 17/731,893

(22) Filed: Apr. 28, 2022

(65) Prior Publication Data

US 2022/0263823 A1 Aug. 18, 2022

Related U.S. Application Data

(63) Continuation of application No. PCT/CN2020/117875, filed on Sep. 25, 2020.

(30) Foreign Application Priority Data

Oct. 31, 2019 (CN) .......................... 201911057490.8

(51) Int. Cl.
G06F 7/04 (2006.01)
G06F 15/16 (2006.01)
(Continued)

(52) U.S. Cl.
CPC ................................ H04L 63/0876 (2013.01)

(58) Field of Classification Search
CPC .................................................. H04L 63/0876
(Continued)

(56) References Cited

U.S. PATENT DOCUMENTS 7,496,662 B1 2/2009 Roesch et al.
2010/0050260 A1 2/2010 Nakakoji et al.
(Continued)

FOREIGN PATENT DOCUMENTS

CN 106534068 A 3/2017
CN 106789934 A 5/2017
(Continued)

OTHER PUBLICATIONS

Yalewski M: "Passive OS fingerprinting tool version 2.0.8," Apr. 7, 2010, XP055963348, 20 pages.
(Continued)

Primary Examiner — Jeffrey C Pwu
Assistant Examiner — Samuel Ambaye
(74) Attorney, Agent, or Firm — Conley Rose, P.C.

(57) ABSTRACT

A packet processing method. A protection device receives a first access request packet. The first access request packet includes a packet sent based on a TCP/IP protocol. The protection device extracts a first fingerprint feature from a transport-layer packet header and/or a network-layer packet header of the first access request packet. The first fingerprint feature corresponds to an operating system type of a terminal device that transmits the first access request packet. The protection device recognizes the first fingerprint feature based on a fingerprint feature database to determine whether to allow the first access request packet to access a server. The protection device allows the first access request packet to pass through when the first access request packet is allowed to access the server. The protection device blocks the first access request packet when the first access request packet is not allowed to access the server.

20 Claims, 13 Drawing Sheets

(51) Int. Cl.
   *H04L 9/40*   (2022.01)
   *H04L 29/06*   (2006.01)

(58) Field of Classification Search
   USPC .............................................................. 726/4
   See application file for complete search history.

(56) References Cited

U.S. PATENT DOCUMENTS

| | | | |
|---|---|---|---|
| 2016/0241576 A1 | 8/2016 | Rathod et al. | |
| 2017/0085567 A1* | 3/2017 | Long | H04L 67/02 |
| 2017/0094527 A1 | 3/2017 | Shattil et al. | |
| 2019/0037025 A1* | 1/2019 | Li | H04L 67/56 |

FOREIGN PATENT DOCUMENTS

| | | |
|---|---|---|
| CN | 107800668 A | 3/2018 |
| CN | 108521408 A | 9/2018 |
| CN | 108600145 A | 9/2018 |
| CN | 110113290 A | 8/2019 |
| CN | 111565203 A | 8/2020 |
| JP | 2010050939 A | 3/2010 |
| JP | 2018534526 A | 11/2018 |
| JP | 2019022066 A | 2/2019 |
| JP | 2019036830 A | 3/2019 |
| KR | 101859562 B1 | 5/2018 |

OTHER PUBLICATIONS

OpenBSD, "pf.conf(5)—OpenBSD manual pages," Sep. 18, 2019, XP055963260, 31 pages.

Edge Jake, "Passive OS fingerprinting added to netfilter," Jun. 10, 2009, XP055963324, 2 pages.

* cited by examiner

PACKET PROCESSING METHOD AND APPARATUS, DEVICE, AND COMPUTER-READABLE STORAGE MEDIUM

CROSS-REFERENCE TO RELATED APPLICATIONS

This application is a continuation of International Patent Application No. PCT/CN2020/117875, filed on Sep. 25, 2020, which claims priority to Chinese Patent Application No. 201911057490.8, filed on Oct. 31, 2019. The disclosures of the aforementioned applications are hereby incorporated by reference in their entireties.

TECHNICAL FIELD

The present disclosure relates to the field of computer communications technologies, and in particular, to a packet processing method, a packet processing apparatus, a protection device, and a computer-readable storage medium.

BACKGROUND

A denial-of-service attack is also referred to as a flood attack. The denial-of-service attack is a cyberattack means aiming to exhaust network or system resources of a target computer to temporarily interrupt or stop a service. Consequently, the service cannot be accessed by a normal user. When a hacker launches a "denial of service" attack on a specific target by using two or more compromised computers on a network as "zombies", the attack is referred to as a distributed denial-of-service (DDoS) attack.

A hacker usually controls a conventional user personal computer (PC) host as a zombie host (bot) of a botnet to launch a DDoS attach. However, nowadays, an increasing quantity of internet of things (IoT) network devices, for example, cameras and routers, are connected to the Internet. Hackers launch DDoS attacks more frequently by intruding into such IoT devices.

Services subject to DDoS attacks are mostly Hypertext Transfer Protocol (HTTP)-based world wide web services. In a conventional technology, a DDoS detection and cleaning vendor detects a format of an HTTP request packet during protection against DDoS, for example, checking whether the packet is a normal request initiated by a user (for example, a browser). Generally, information about a user-agent field in an HTTP request is checked, where the field indicates a browser version. If it is detected that the request is not a normal user (browser) request, current communication is blocked, thereby mitigating a DDoS attack. However, an HTTP attack packet is prone to be forged. For example, a normal user request packet is found and then completely copied to an attack packet. In this way, hackers can evade attack detection with relative ease.

How to better recognize a DDoS attack and block or filter abnormal access to better avoid DDoS attacks is a technical problem that has been long studied.

SUMMARY

Embodiments of this application disclose a packet processing method, a packet processing apparatus, and a protection device, so as to resolve a technical problem in a conventional technology that hackers can evade attack detection with relative ease to make a target service susceptible to DDoS attacks.

According to a first aspect, an embodiment of this application provides a packet processing method. The method may include: receiving, by a protection device, a first access request packet, where the first access request packet includes a packet sent based on a Transmission Control Protocol/Internet Protocol (TCP/IP) protocol, and a destination of the first access request packet is a server protected by the protection device; extracting, by the protection device, a first fingerprint feature from a transport-layer packet header and/or a network-layer packet header of the first access request packet, where the first fingerprint feature corresponds to an operating system type of a terminal device that sends the first access request packet; recognizing the first fingerprint feature based on a fingerprint feature database to determine whether to allow the first access request packet to access the server, where the fingerprint feature database includes a fingerprint feature corresponding to an operating system type of a terminal device that is allowed to access the server and/or a fingerprint feature corresponding to an operating system type of a terminal device that is not allowed to access the server; and when the first access request packet is allowed to access the server, allowing the first access request packet to pass through; or when the first access request packet is not allowed to access the server, blocking the first access request packet.

By using the foregoing technical means, information in the transport-layer packet header and/or the network-layer packet header is implemented or generated depending on an operating system. In other words, a fingerprint feature (such as TCP header and option features or an IP header feature) in the transport-layer packet header and/or the network-layer packet header is related to an operating system (OS) type and cannot be modified by a common program. If a hacker wants to implement forgery by establishing a raw socket or modifying an OS, where modifying an OS means modifying a protocol stack of the OS, the hacker needs to re-compile the OS. However, original code of the OS is basically proprietary and confidential information of the OS provider (especially for a current IoT system, an increasing quantity of devices run OSs developed by respective vendors of the devices). Therefore, re-compilation is both highly difficult and costly. Therefore, it is difficult for a hacker to forge a packet by modifying the fingerprint feature in the transport-layer packet header and/or the network-layer packet header, thereby resolving a technical problem in a conventional technology that hackers can evade attack detection with relative ease to make a target service susceptible to DDoS attacks. The protection device, for example, an anti-DDoS device, can accurately recognize whether an access request is valid normal user access by recognizing a fingerprint feature in a transport-layer packet header and/or a network-layer packet header of an attack packet, and can block an abnormal user access request, thereby better preventing and mitigating DDoS attacks and better avoiding DDoS attacks.

In a possible implementation, the fingerprint feature database includes a fingerprint feature corresponding to an OS type of a terminal device that is allowed to access the server, and the recognizing the first fingerprint feature based on a fingerprint feature database to determine whether to allow the first access request packet to access the server includes: determining whether the fingerprint feature database includes the first fingerprint feature; and when the fingerprint feature database includes the first fingerprint feature, determining to allow the first access request packet to access the server; or when the fingerprint feature database does not include the first fingerprint feature, determining not to allow the first access request packet to access the server.

In this embodiment of this application, whether the fingerprint feature database includes the first fingerprint feature is directly determined. This can rapidly and efficiently determine whether to allow the first access request packet to access the server.

In a possible implementation, before the receiving a first access request packet, the method further includes: receiving an input transport-layer fingerprint feature and/or network-layer fingerprint feature, and storing the input fingerprint features/fingerprint feature in the fingerprint feature database; or analyzing a second access request packet in a normal service model to obtain a transport-layer fingerprint feature and/or a network-layer fingerprint feature, and storing the fingerprint features/fingerprint feature obtained through analysis in the fingerprint feature database.

The protection device in this embodiment of this application may automatically learn of or analyze, through self-learning, a transport-layer fingerprint feature and/or a network-layer fingerprint feature of an access request packet in the normal service model, and store the fingerprint features/fingerprint feature in the fingerprint feature database. Alternatively, a user such as a developer or research and development engineer may configure a transport-layer fingerprint feature and/or a network-layer fingerprint feature of an access request packet in the normal service model. In this case, the protection device may receive the fingerprint features/fingerprint feature, and store the fingerprint features/fingerprint feature in the fingerprint feature database, so that a DDoS attack is recognized subsequently based on a fingerprint feature in the fingerprint feature database.

In a possible implementation, different transport-layer fingerprint features and/or network-layer fingerprint features may correspond to different OS types, for example, Windows 7/8, Windows 10, Linux 2.4, and Linux 4.1. Then, a user such as a developer or research and development engineer may alternatively directly configure a client OS type list; or a client OS type list is configured by automatically learning of, through self-learning, an OS type corresponding to the normal service model. An OS type in the client OS type list may be an OS type whose access is allowed. In this way, an OS blocking policy is configured more flexibly and more rapidly and efficiently, and a user requirement for fast responses can be met in the face of ever-changing DDoS attacks, thereby better preventing and mitigating DDoS attacks and better protecting the server from DDoS attacks.

A fingerprint feature corresponding to a packet that is allowed to access the server is configured in the fingerprint feature database in advance, so that whether to allow the first access request packet to pass through or block the first access request packet is determined based on whether the fingerprint feature database includes the first fingerprint feature. In this way, whether an access request is valid normal user access can be accurately recognized, and an abnormal user access request can be well blocked, thereby better preventing and mitigating DDoS attacks and better protecting the server from DDoS attacks.

In a possible implementation, the fingerprint feature database includes a fingerprint feature corresponding to an OS type of a terminal device that is not allowed to access the server, and the recognizing the first fingerprint feature based on a fingerprint feature database to determine whether to allow the first access request packet to access the server includes: determining whether the fingerprint feature database includes the first fingerprint feature; and when the fingerprint feature database includes the first fingerprint feature, determining not to allow the first access request packet to access the server; or when the fingerprint feature database does not include the first fingerprint feature, determining to allow the first access request packet to access the server.

In this embodiment of this application, whether the fingerprint feature database includes the first fingerprint feature is directly determined. This can rapidly and efficiently determine whether to allow the first access request packet to access the server.

In a possible implementation, before the receiving a first access request packet, the method further includes: receiving an input transport-layer fingerprint feature and/or network-layer fingerprint feature, and storing the input fingerprint features/fingerprint feature in the fingerprint feature database; or analyzing a third access request packet in an attack service model to obtain a transport-layer fingerprint feature and/or a network-layer fingerprint feature, and storing the fingerprint features/fingerprint feature obtained through analysis in the fingerprint feature database.

The protection device in this embodiment of this application may automatically learn of or analyze, through self-learning, a transport-layer fingerprint feature and/or a network-layer fingerprint feature of an access request packet in the attack service model, and store the fingerprint features/fingerprint feature in the fingerprint feature database. Alternatively, a user such as a developer or research and development engineer may configure a transport-layer fingerprint feature and/or a network-layer fingerprint feature of an access request packet in the attack service model. In this case, the protection device may receive the fingerprint features/fingerprint feature, and store the fingerprint features/fingerprint feature in the fingerprint feature database, so that a DDoS attack is recognized subsequently based on a fingerprint feature in the fingerprint feature database.

In a possible implementation, different transport-layer fingerprint features and/or network-layer fingerprint features may correspond to different OS types, for example, Windows 7/8, Windows 10, Linux 2.4, and Linux 4.1. Then, a user such as a developer or research and development engineer may alternatively directly configure a client OS type list; or a client OS type list is configured by automatically learning of, through self-learning, an OS type corresponding to the attack service model. An OS type in the client OS type list may be an OS type whose access is forbidden. In this way, an OS blocking policy is configured more flexibly and more rapidly and efficiently, and a user requirement for fast responses can be met in the face of ever-changing DDoS attacks, thereby better preventing and mitigating DDoS attacks and better protecting the server from DDoS attacks.

A fingerprint feature corresponding to a client whose access is forbidden is configured in the fingerprint feature database in advance, so that whether to allow the first access request packet to pass through or block the first access request packet is determined based on whether the fingerprint feature database includes the first fingerprint feature. In this way, whether an access request is valid normal user access can be accurately recognized, and an abnormal user access request can be well blocked, thereby better preventing and mitigating DDoS attacks and better protecting the server from DDoS attacks.

In a possible implementation, the fingerprint feature database includes a fingerprint feature corresponding to an OS type of a terminal device that is allowed to access the server and a fingerprint feature corresponding to an OS type of a terminal device that is not allowed to access the server, and the recognizing the first fingerprint feature based on a fingerprint feature database to determine whether to allow the first access request packet to access the server includes: recognizing, based on the fingerprint feature database, an OS type corresponding to the first fingerprint feature, where the fingerprint feature database includes a correspondence between an OS type and a fingerprint feature; and determining, based on a first OS type list or a second OS type list, whether to allow the first access request packet to access the server, where the first OS type list includes at least one OS type that is allowed to access the server, and the second OS type list includes at least one OS type that is not allowed to access the server.

In this embodiment of this application, the fingerprint feature database may include a fingerprint feature corresponding to an OS type of a terminal device that is allowed to access the server and a fingerprint feature corresponding to an OS type of a terminal device that is not allowed to access the server. In addition, the fingerprint feature database includes the correspondence between an OS type and a fingerprint feature. Different transport-layer fingerprint features and/or network-layer fingerprint features may correspond to different OS types, for example, Windows 7/8, Windows 10, Linux 2.4, and Linux 4.1. Then, a user such as a developer or research and development engineer may alternatively directly configure a client OS type list; or a client OS type list is configured by automatically learning of, through self-learning, an OS type corresponding to the attack service model. The first OS type list may include the at least one OS type that is allowed to access the server, and the second OS type list may include the at least one OS type that is not allowed to access the server. Then, after the OS type corresponding to the first fingerprint feature is recognized based on the fingerprint feature database, whether the first access request packet is allowed to access the server can be determined based on the first OS type list or the second OS type list. In this way, an OS blocking policy is configured more flexibly and more rapidly and efficiently, and a user requirement for fast responses can be met in the face of ever-changing DDoS attacks, thereby better preventing and mitigating DDoS attacks and better protecting the server from DDoS attacks.

In a possible implementation, in the packet processing method in this embodiment of this application, the step of extracting a first fingerprint feature from a transport-layer packet header and/or a network-layer packet header of the first access request packet may further be triggered and performed only when it is detected that the server is subject to a DDoS attack.

When a fingerprint feature is extracted and recognized for each received access request packet, a transmission delay of the access request packet is increased, affecting access experience of a normal user. By using the foregoing technical means, extraction and recognition of a fingerprint feature are triggered only when it is detected that the server is subject to a DDoS attack. This can well balance efficiency of normal access and mitigation of DDoS attacks.

In a possible implementation, the first access request packet in this embodiment of this application includes a synchronize (SYN) packet.

The SYN packet is a first request packet sent by a client to the server when a TCP connection is established. Therefore, whether the access request is a DDoS attack can be recognized at a highest speed by directly performing fingerprint feature extraction and recognition on the SYN packet, thereby better preventing and mitigating DDoS attacks and better avoiding DDoS attacks.

According to a second aspect, an embodiment of this application provides a packet processing method, including: receiving, by a protection device, a first access request packet, where the first access request packet includes a packet sent based on a TCP/IP protocol, and a destination of the access request packet is a server protected by the protection device; extracting, by the protection device, a first fingerprint feature from a transport-layer packet header and/or a network-layer packet header of the first access request packet, where the first fingerprint feature corresponds to an OS type of a terminal device that sends the first access request packet; recognizing, based on a fingerprint feature database, an OS type corresponding to the first fingerprint feature, where the fingerprint feature database includes a correspondence between an OS type and a fingerprint feature; determining, based on a first OS type list or a second OS type list, whether to allow the first access request packet to access the server, where the first OS type list includes at least one OS type that is allowed to access the server, and the second OS type list includes at least one OS type that is not allowed to access the server; and when the first access request packet is allowed to access the server, allowing the first access request packet to pass through; or when the first access request packet is not allowed to access the server, blocking the first access request packet.

In this embodiment of this application, the fingerprint feature database includes the correspondence between an OS type and a fingerprint feature. Different transport-layer fingerprint features and/or network-layer fingerprint features may correspond to different OS types, for example, Windows 7/8, Windows 10, Linux 2.4, and Linux 4.1. Then, a user such as a developer or research and development engineer may alternatively directly configure a client OS type list; or a client OS type list is configured by automatically learning of, through self-learning, an OS type corresponding to an attack service model. The first OS type list may include at least one OS type that is allowed to access the server, and the second OS type list may include at least one OS type that is not allowed to access the server. Then, after the OS type corresponding to the first fingerprint feature is recognized based on the fingerprint feature database, whether the first access request packet is allowed to access the server can be determined based on the first OS type list or the second OS type list. In this way, an OS blocking policy is configured more flexibly and more rapidly and efficiently, and a user requirement for fast responses can be met in the face of ever-changing DDoS attacks, thereby better preventing and mitigating DDoS attacks and better protecting the server from DDoS attacks.

According to a third aspect, an embodiment of this application provides a protection device, including a processor and a network device, where the network interface is configured to receive a first access request packet, where the first access request packet includes a packet sent based on a TCP/IP protocol, and a destination of the first access request packet is a server protected by the protection device; and the processor is configured to invoke a stored computer program to perform the following operations: extracting a first fingerprint feature from a transport-layer packet header and/or a network-layer packet header of the first access request packet, where the first fingerprint feature corresponds to an OS type of a terminal device that sends the first access request packet; recognizing the first fingerprint feature based on a fingerprint feature database to determine whether to allow the first access request packet to access the server, where the fingerprint feature database includes a fingerprint feature corresponding to an OS type of a terminal device that is allowed to access the server and/or a fingerprint feature corresponding to an OS type of a terminal device that is not allowed to access the server; and when the first access request packet is allowed to access the server, allowing the first access request packet to pass through; or when the first access request packet is not allowed to access the server, blocking the first access request packet.

In a possible implementation, the fingerprint feature database includes a fingerprint feature corresponding to an OS type of a terminal device that is allowed to access the server, and the recognizing, by the processor, the first fingerprint feature based on a fingerprint feature database to determine whether to allow the first access request packet to access the server includes: determining, by the processor, whether the fingerprint feature database includes the first fingerprint feature; and when the fingerprint feature database includes the first fingerprint feature, determining to allow the first access request packet to access the server; or when the fingerprint feature database does not include the first fingerprint feature, determining not to allow the first access request packet to access the server.

In a possible implementation, the protection device further includes an input device; and the input device is configured to: before the network interface receives the first access request packet, receive an input transport-layer fingerprint feature and/or network-layer fingerprint feature, and store the input fingerprint features/fingerprint feature in the fingerprint feature database; or the processor is further configured to: before the network interface receives the first access request packet, analyze a second access request packet in a normal service model to obtain a transport-layer fingerprint feature and/or a network-layer fingerprint feature, and store the fingerprint features/fingerprint feature obtained through analysis in the fingerprint feature database.

In a possible implementation, the fingerprint feature database includes a fingerprint feature corresponding to an OS type of a terminal device that is not allowed to access the server, and the recognizing, by the processor, the first fingerprint feature based on a fingerprint feature database to determine whether to allow the first access request packet to access the server includes: determining, by the processor, whether the fingerprint feature database includes the first fingerprint feature; and when the fingerprint feature database includes the first fingerprint feature, determining not to allow the first access request packet to access the server; or when the fingerprint feature database does not include the first fingerprint feature, determining to allow the first access request packet to access the server.

In a possible implementation, the protection device further includes an input device; and the input device is configured to: before the network interface receives the first access request packet, receive an input transport-layer fingerprint feature and/or network-layer fingerprint feature, and store the input fingerprint features/fingerprint feature in the fingerprint feature database; or the processor is further configured to: before the network interface receives the first access request packet, analyze a third access request packet in an attack service model to obtain a transport-layer fingerprint feature and/or a network-layer fingerprint feature, and store the fingerprint features/fingerprint feature obtained through analysis in the fingerprint feature database.

In a possible implementation, the fingerprint feature database includes a fingerprint feature corresponding to an OS type of a terminal device that is allowed to access the server and a fingerprint feature corresponding to an OS type of a terminal device that is not allowed to access the server, and the recognizing, by the processor, the first fingerprint feature based on a fingerprint feature database to determine whether to allow the first access request packet to access the server includes: recognizing, by the processor based on the fingerprint feature database, an OS type corresponding to the first fingerprint feature, where the fingerprint feature database includes a correspondence between an OS type and a fingerprint feature; and determining, based on a first OS type list or a second OS type list, whether to allow the first access request packet to access the server, where the first OS type list includes at least one OS type that is allowed to access the server, and the second OS type list includes at least one OS type that is not allowed to access the server.

In a possible implementation, the processor may alternatively trigger and perform, only when it is detected that the server is subject to a DDoS attack, the step of extracting a first fingerprint feature from a transport-layer packet header and/or a network-layer packet header of the first access request packet.

In a possible implementation, the first access request packet in this embodiment of this application includes a SYN packet.

According to a fourth aspect, an embodiment of this application provides a protection device, including a processor and a network interface, where the network interface is configured to receive a first access request packet, where the first access request packet includes a packet sent based on a TCP/IP protocol, and a destination of the first access request packet is a server protected by the protection device; and the processor is configured to invoke a stored computer program to perform the following operations: extracting a first fingerprint feature from a transport-layer packet header and/or a network-layer packet header of the first access request packet, where the first fingerprint feature corresponds to an OS type of a terminal device that sends the first access request packet; recognizing, based on a fingerprint feature database, an OS type corresponding to the first fingerprint feature, where the fingerprint feature database includes a correspondence between an OS type and a fingerprint feature; determining, based on a first OS type list or a second OS type list, whether to allow the first access request packet to access the server, where the first OS type list includes at least one OS type that is allowed to access the server, and the second OS type list includes at least one OS type that is not allowed to access the server; and when the first access request packet is allowed to access the server, allowing the first access request packet to pass through; or when the first access request packet is not allowed to access the server, blocking the first access request packet.

According to a fifth aspect, an embodiment of this application provides a packet processing apparatus, including: a packet receiving unit configured to receive a first access request packet, where the first access request packet includes a packet sent based on a TCP/IP protocol, and a destination of the first access request packet is a server protected by the packet processing apparatus; a fingerprint feature extraction unit configured to extract a first fingerprint feature from a transport-layer packet header and/or a network-layer packet header of the first access request packet, where the first fingerprint feature corresponds to an OS type of a terminal device that sends the first access request packet; and a processing unit configured to recognize the first fingerprint feature based on a fingerprint feature database to determine whether to allow the first access request packet to access the server, where the fingerprint feature database includes a fingerprint feature corresponding to an OS type of a terminal device that is allowed to access the server and/or a fingerprint feature corresponding to an OS type of a terminal device that is not allowed to access the server, where when the first access request packet is allowed to access the server, the processing unit allows the first access request packet to pass through; or when the first access request packet is not allowed to access the server, the processing unit blocks the first access request packet.

In a possible implementation, the fingerprint feature database includes a fingerprint feature corresponding to an OS type of a terminal device that is allowed to access the server, and the processing unit is further configured to: determine whether the fingerprint feature database includes the first fingerprint feature; and when the fingerprint feature database includes the first fingerprint feature, determine to allow the first access request packet to access the server; or when the fingerprint feature database does not include the first fingerprint feature, determine not to allow the first access request packet to access the server.

In a possible implementation, the apparatus further includes: a first feature receiving unit configured to: before the packet receiving unit receives the first access request packet, receive an input transport-layer fingerprint feature and/or network-layer fingerprint feature, and store the input fingerprint features/fingerprint feature in the fingerprint feature database; or a first feature analysis unit configured to: before the packet receiving unit receives the first access request packet, analyze a second access request packet in a normal service model to obtain a transport-layer fingerprint feature and/or a network-layer fingerprint feature, and store the fingerprint features/fingerprint feature obtained through analysis in the fingerprint feature database.

In a possible implementation, the fingerprint feature database includes a fingerprint feature corresponding to an OS type of a terminal device that is not allowed to access the server, and the processing unit is further configured to: determine whether the fingerprint feature database includes the first fingerprint feature; and when the fingerprint feature database includes the first fingerprint feature, determine not to allow the first access request packet to access the server; or when the fingerprint feature database does not include the first fingerprint feature, determine to allow the first access request packet to access the server.

In a possible implementation, the apparatus further includes: a second feature receiving unit configured to: before the packet receiving unit receives the first access request packet, receive an input transport-layer fingerprint feature and/or network-layer fingerprint feature, and store the input fingerprint features/fingerprint feature in the fingerprint feature database; or a second feature analysis unit configured to: before the packet receiving unit receives the first access request packet, analyze a third access request packet in an attack service model to obtain a transport-layer fingerprint feature and/or a network-layer fingerprint feature, and store the fingerprint features/fingerprint feature obtained through analysis in the fingerprint feature database.

In a possible implementation, the fingerprint feature database includes a fingerprint feature corresponding to an OS type of a terminal device that is allowed to access the server and a fingerprint feature corresponding to an OS type of a terminal device that is not allowed to access the server, and the processing unit is further configured to: recognize, based on the fingerprint feature database, an OS type corresponding to the first fingerprint feature, where the fingerprint feature database includes a correspondence between an OS type and a fingerprint feature; and determine, based on a first OS type list or a second OS type list, whether to allow the first access request packet to access the server, where the first OS type list includes at least one OS type that is allowed to access the server, and the second OS type list includes at least one OS type that is not allowed to access the server.

In a possible implementation, the fingerprint feature extraction unit may alternatively trigger and perform, only when it is detected that the server is subject to a DDoS attack, the step of extracting a first fingerprint feature from a transport-layer packet header and/or a network-layer packet header of the first access request packet.

In a possible implementation, the first access request packet in this embodiment of this application includes a SYN packet.

According to a sixth aspect, an embodiment of this application provides a computer-readable storage medium. The computer-readable storage medium stores a program, and the program includes instructions used to perform some or all steps of any method according to the first aspect.

According to a seventh aspect, an embodiment of this application provides a chip, including at least one processor and an interface circuit. The processor is configured to: after a first access request packet is input through the interface circuit, execute a computer program stored in a memory to perform the following steps: extracting a first fingerprint feature from a transport-layer packet header and/or a network-layer packet header of the first access request packet, where the first fingerprint feature corresponds to an OS type of a terminal device that sends the first access request packet, the first access request packet includes a packet sent based on a TCP/IP protocol, and a destination of the first access request packet is a server protected by the chip; recognizing the first fingerprint feature based on a fingerprint feature database to determine whether to allow the first access request packet to access the server, where the fingerprint feature database includes a fingerprint feature corresponding to an OS type of a terminal device that is allowed to access the server or a fingerprint feature corresponding to an OS type of a terminal device that is not allowed to access the server; and when the first access request packet is allowed to access the server, allowing the first access request packet to pass through; or when the first access request packet is not allowed to access the server, blocking the first access request packet.

In a possible implementation, the fingerprint feature database includes a fingerprint feature corresponding to an OS type of a terminal device that is allowed to access the server, and the recognizing, by the processor, the first fingerprint feature based on a fingerprint feature database to determine whether to allow the first access request packet to access the server specifically includes: determining whether the fingerprint feature database includes the first fingerprint feature; and when the fingerprint feature database includes the first fingerprint feature, determining to allow the first access request packet to access the server; or when the fingerprint feature database does not include the first fingerprint feature, determining not to allow the first access request packet to access the server.

In a possible implementation, before the first access request packet is input through the interface circuit, the processor is further configured to: store a received input transport-layer fingerprint feature and/or network-layer fingerprint feature in the fingerprint feature database; or analyze a second access request packet in a normal service model to obtain a transport-layer fingerprint feature and/or a network-layer fingerprint feature, and store the fingerprint features/fingerprint feature obtained through analysis in the fingerprint feature database.

In a possible implementation, the fingerprint feature database includes a fingerprint feature corresponding to an OS type of a terminal device that is not allowed to access the server, and the recognizing, by the processor, the first fingerprint feature based on a fingerprint feature database to determine whether to allow the first access request packet to access the server specifically includes: determining whether the fingerprint feature database includes the first fingerprint feature; and when the fingerprint feature database includes the first fingerprint feature, determining not to allow the first access request packet to access the server; or when the fingerprint feature database does not include the first fingerprint feature, determining to allow the first access request packet to access the server.

In a possible implementation, before the first access request packet is input through the interface circuit, the processor is further configured to: store a received input transport-layer fingerprint feature and/or network-layer fingerprint feature in the fingerprint feature database; or analyze a third access request packet in an attack service model to obtain a transport-layer fingerprint feature and/or a network-layer fingerprint feature, and store the fingerprint features/fingerprint feature obtained through analysis in the fingerprint feature database.

In a possible implementation, the processor may alternatively trigger and perform, only when it is detected that the server is subject to a DDoS attack, the step of extracting a first fingerprint feature from a transport-layer packet header and/or a network-layer packet header of the first access request packet.

In a possible implementation, the first access request packet in this embodiment of this application includes a SYN packet.

According to an eighth aspect, an embodiment of this application provides a computer program product. When the computer program product runs on a computer, the computer is enabled to perform some or all steps of any method according to the first aspect.

In the technical solutions in the foregoing first to eighth aspects:

In a possible implementation, the first fingerprint feature and a fingerprint feature in the fingerprint feature database are transport-layer fingerprint features; and the transport-layer fingerprint features include one or more of the following: option sorting information of a TCP option; maximum segment size information; window size information; window scale information; and don't fragment (DF) flag bit information.

In the technical solutions in the foregoing first to eighth aspects:

In a possible implementation, the first fingerprint feature and a fingerprint feature in the fingerprint feature database are network-layer fingerprint features; and the network-layer fingerprint features include one or more of the following: time-to-live information of an IP packet; and IP header identification information.

The foregoing transport-layer fingerprint feature or network-layer fingerprint feature is an inherent system fingerprint feature that each OS has in complying with or using the TCP/IP protocol, and varies with the OS, for example, Windows, Linux, or other IoT devices. When a hacker controls such devices, attack traffic usually imitates a normal access feature of a user. For example, a version of a well-known browser is added to a user-agent field in the HTTP protocol without modifying a protocol stack. Therefore, a protocol stack of traffic is recognized on a DDoS protection device by recognizing the foregoing transport-layer fingerprint feature or network-layer fingerprint feature, to block obvious attack traffic, thereby preventing and mitigating DDoS attacks.

It should be understood that, the technical solutions in the second aspect to the eighth aspect of this application are consistent with the technical solution in the first aspect. Beneficial effects achieved in the various aspects and corresponding feasible implementations are similar, and details are not described again.

BRIEF DESCRIPTION OF DRAWINGS

To describe technical solutions in embodiments of this application or in the background more clearly, the following describes the accompanying drawings for describing the embodiments of this application or the background.

FIG. 8 is a schematic diagram of a fingerprint feature corresponding to an OS according to an embodiment of the present disclosure;

FIG. 11 is a schematic diagram of a fingerprint feature corresponding to an OS according to another embodiment of the present disclosure;

DESCRIPTION OF EMBODIMENTS

The following describes embodiments of the present disclosure with reference to the accompanying drawings.

Figure 1:
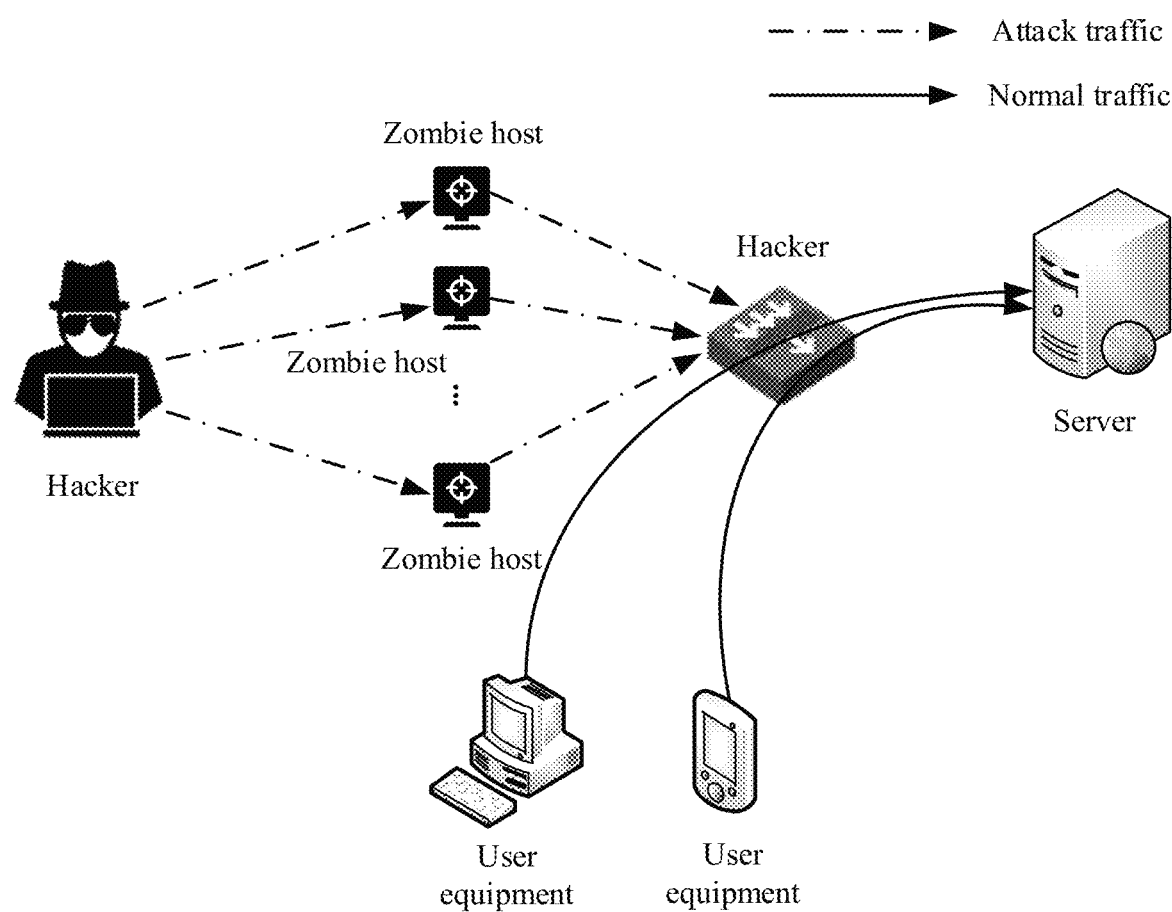
FIG. 1 is a schematic diagram of an application scenario of a packet processing method according to an embodiment of the present disclosure.

FIG. 1 is a schematic diagram of an application scenario of a packet processing method according to an embodiment of the present disclosure. A network to which the packet processing method in this embodiment of the present disclosure is applied includes at least one hacker. In FIG. 1, one hacker is used as an example for description. The hacker is an attacker or an attack device that launches a DDoS attack or a DoS attack. The hacker may control one zombie host (bot) to launch a DoS attack on a server or control a plurality of bots to launch a DDoS attack on a server. An anti-distributed denial-of-service (Anti-DDoS) device or an anti-denial-of-service device is deployed before the server, to implement DDoS traffic cleaning for the server. To be specific, when a DDoS attack occurs, received attack traffic is recognized and blocked, to mitigate the DDoS attack or DoS attack, thereby protecting normal access to the server from a normal user. The anti-DDoS device or the anti-denial-of-service device is a protection device in the embodiments of the present disclosure. In FIG. 1, the anti-DDoS device is used as an example for description.

The bot in this embodiment of the present disclosure may be a conventional user personal computer (PC) host, or an IoT network device that can be connected to the Internet, for example, a camera or a router.

The server in this embodiment of the present disclosure is a computer that provides a normal service for a business. A user terminal can establish a connection to the server over the Internet and access the business provided by the server. For example, the server is a gaming server. A user accesses data of a game on the gaming server to run the game.

Figure 2:
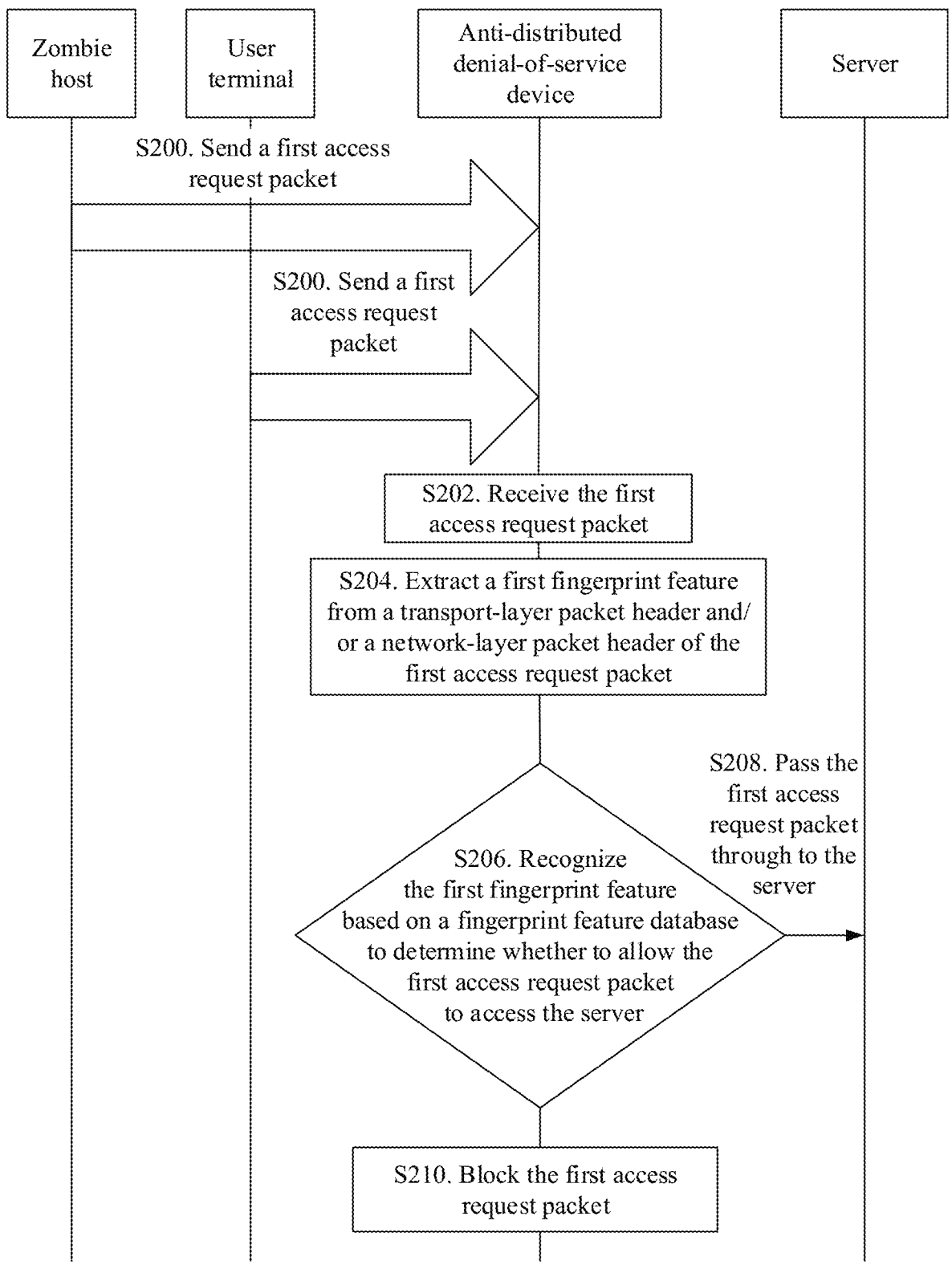
FIG. 2 is a schematic flowchart of a packet processing method according to an embodiment of the present disclosure.

For example, an anti-DDoS device implements DDoS protection. In combination with a schematic flowchart, shown in FIG. 2, of a packet processing method provided in an embodiment of the present disclosure, the following describes how the anti-DDoS device implements DDoS protection. As shown in FIG. 2, the packet processing method provided in this embodiment of the present disclosure includes the following steps.

Step S200: A zombie host or a normal user terminal sends a first access request packet to a server.

Further, the first access request packet in this embodiment of the present disclosure includes a packet sent based on a TCP/IP protocol, and the first access request packet is a packet for establishing a TCP/IP connection to the server. A bot controlled by a hacker sends a first access request packet to the server, to request access to a service provided by the server. A normal user terminal may also send a first access request packet to the server, to request access to the service provided by the server.

Step S202: An anti-DDoS device receives the first access request packet.

Further, the anti-DDoS device is a device deployed before the server. Optionally, in this embodiment of the present disclosure, the anti-DDoS device is triggered to perform step S204 only when it is detected that the server is subject to a DDoS attack. When the server is not subject to a DDoS attack, the anti-DDoS device may directly pass the received first access request packet through to the server.

Step S204: The anti-DDoS device extracts a first fingerprint feature from a transport-layer packet header and/or a network-layer packet header of the first access request packet.

Further, a transport-layer fingerprint feature in this embodiment of the present disclosure may include one or more of the following: option sorting information of a TCP header or option, maximum segment size (MSS) information, window size information, window scale information, and the like.

A network-layer fingerprint feature in this embodiment of the present disclosure may include one or more of the following: time-to-live information of an IP packet, payload length information of a data segment, IP header identification information such as a DF flag bit, and the like.

After the anti-DDoS device extracts the fingerprint feature from the transport-layer packet header and/or the network-layer packet header of the received first access request packet, a transport-layer first fingerprint feature and/or a network-layer first fingerprint feature of the first access request packet can be extracted.

The transport-layer fingerprint feature or the network-layer fingerprint feature in this embodiment of the present disclosure is an inherent system fingerprint feature that each OS has in complying with or using the TCP/IP protocol, and varies with the OS. Therefore, the first fingerprint feature corresponds to an OS type of a terminal device that sends the first access request packet.

Step S206: The anti-DDoS device recognizes the first fingerprint feature based on a fingerprint feature database to determine whether to allow the first access request packet to access the server, where the fingerprint feature database is used for recognizing the extracted first fingerprint feature to determine whether to allow an access request of the first access request packet.

Further, before step S206, the anti-DDoS device may generate the fingerprint feature database in advance. For example, the anti-DDoS device may automatically learn of or analyze, through self-learning, an access request packet in a normal service model to obtain a transport-layer fingerprint feature and/or a network-layer fingerprint feature, or receive a transport-layer fingerprint feature and/or a network-layer fingerprint feature input by a user; and then store the transport-layer fingerprint feature and/or the network-layer fingerprint feature in the fingerprint feature database. In this case, the fingerprint feature database includes a fingerprint feature corresponding to an OS type of a terminal device that is allowed to access the server. Alternatively, the anti-DDoS device may automatically learn of or analyze, through self-learning, an access request packet in an attack service model to obtain a transport-layer fingerprint feature and/or a network-layer fingerprint feature, or receive a transport-layer fingerprint feature and/or a network-layer fingerprint feature input by a user; and then store the transport-layer fingerprint feature and/or the network-layer fingerprint feature in the fingerprint feature database. In this case, the fingerprint feature database includes a fingerprint feature corresponding to an OS type of a terminal device that is not allowed to access the server.

For example, when the fingerprint feature database includes a fingerprint feature corresponding to an OS type of a terminal device that is allowed to access the server, when it is determined that the fingerprint feature database includes the first fingerprint feature, it indicates that the first access request packet is allowed to access the server, and step S208 is performed; when it is determined that the fingerprint feature database does not include the first fingerprint feature, it indicates that the first access request packet is not allowed to access the server, and step S210 is performed.

Step S208: The anti-DDoS device passes the first access request packet through to the server.

Step S210: The anti-DDoS device blocks the first access request packet.

In a possible implementation, the fingerprint feature database may include a fingerprint feature corresponding to an OS type of a terminal device that is allowed to access the server and a fingerprint feature corresponding to an OS type of a terminal device that is not allowed to access the server. The fingerprint feature database further includes a correspondence between an OS type and a fingerprint feature.

Then, step S206 may be specifically: recognizing, based on the fingerprint feature database, an OS type corresponding to the first fingerprint feature; and determining, based on a first OS type list or a second OS type list, whether to allow the first access request packet to access the server, where the first OS type list includes at least one OS type that is allowed to access the server, and the second OS type list includes at least one OS type that is not allowed to access the server.

Further, the transport-layer fingerprint feature or the network-layer fingerprint feature in this embodiment of the present disclosure is an inherent system fingerprint feature that each OS has in complying with or using the TCP/IP protocol, and varies with the OS. Then, the anti-DDoS device may recognize, based on the fingerprint feature database, the OS type corresponding to the first fingerprint feature.

In addition, the anti-DDoS device may alternatively create the first OS type list or the second OS type list in advance. The first OS type list includes at least one OS type that is allowed to access the server, and the second OS type list includes at least one OS type that is not allowed to access the server. The first OS type list or the second OS type list may be an OS type configured and input by the user. Alternatively, the first OS type list may be obtained in the following manner: The access request packet in the normal service model is automatically learned of or analyzed through self-learning, to obtain the transport-layer fingerprint feature and/or the network-layer fingerprint feature; and then an OS type corresponding to the fingerprint features/fingerprint feature is obtained. The second OS type list may alternatively be obtained in the following manner: The access request packet in the attack service model is automatically learned of or analyzed through self-learning, to obtain the transport-layer fingerprint feature and/or the network-layer fingerprint feature; and then an OS type corresponding to the fingerprint features/fingerprint feature is obtained.

Then, the anti-DDoS device may perform determining based on the first OS type list. When it is determined that the OS type corresponding to the first fingerprint feature is in the first OS type list, it indicates that the first access request packet is allowed to access the server, and step S208 is performed; when it is determined that the OS type corresponding to the first fingerprint feature is not in the first OS type list, it indicates that the first access request packet is not allowed to access the server, and step S210 is performed. Alternatively, the anti-DDoS device may perform determining based on the second OS type list. When it is determined that the OS type corresponding to the first fingerprint feature is not in the second OS type list, it indicates that the first access request packet is allowed to access the server, and step S208 is performed; when it is determined that the OS type corresponding to the first fingerprint feature is in the second OS type list, it indicates that the first access request packet is not allowed to access the server, and step S210 is performed.

Figure 3:
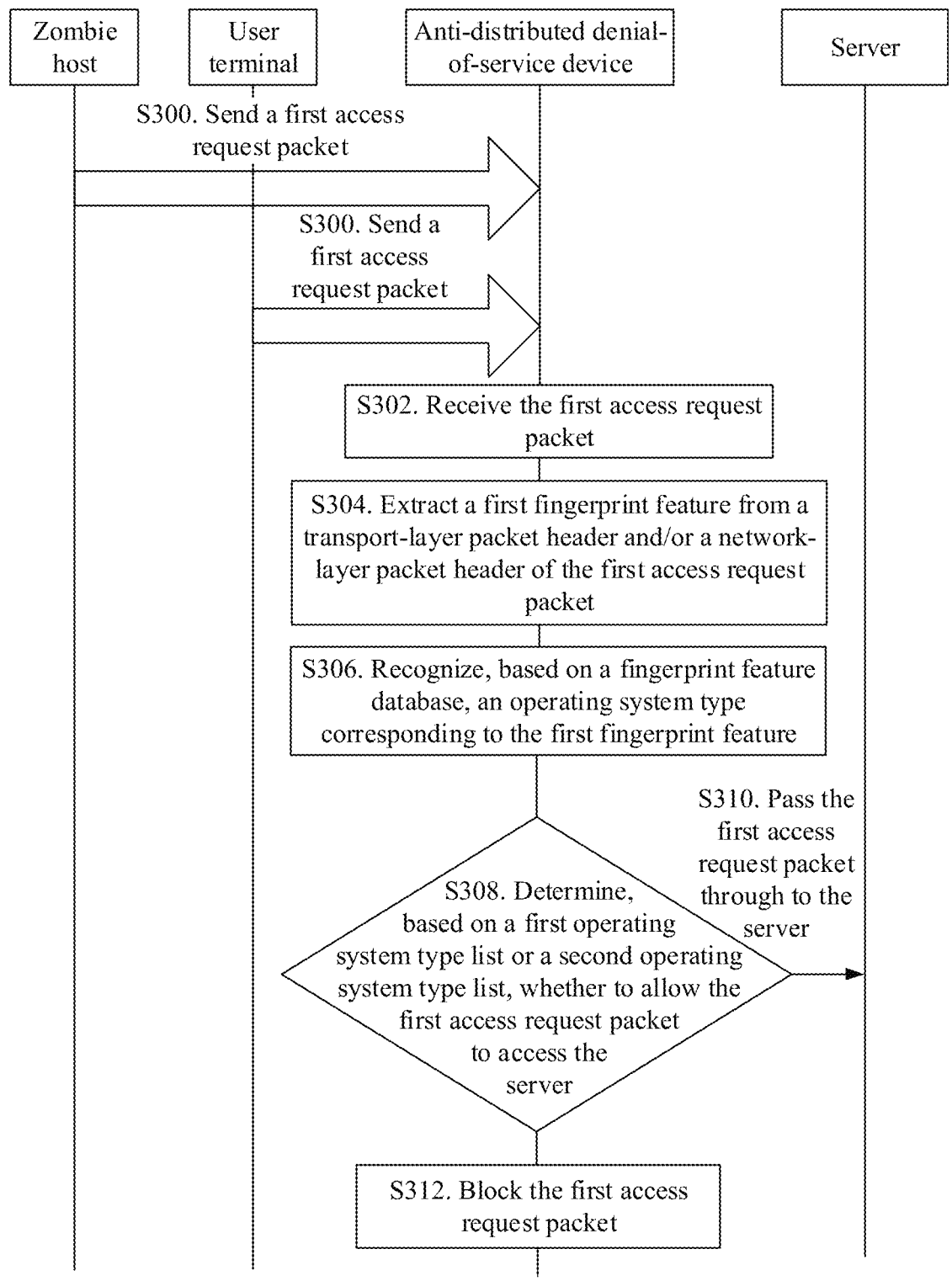
FIG. 3 is a schematic flowchart of a packet processing method according to another embodiment of the present disclosure.

FIG. 3 is a schematic flowchart of a packet processing method according to another embodiment of the present disclosure, and illustrates how an anti-DDoS device implements DDoS protection. As shown in FIG. 3, the packet processing method provided in this embodiment of the present disclosure includes the following steps.

Step S300: A zombie host or a normal user terminal sends a first access request packet to a server.

Step S302: The anti-DDoS device receives the first access request packet.

Step S304: The anti-DDoS device extracts a first fingerprint feature from a transport-layer packet header and/or a network-layer packet header of the first access request packet.

For details about steps S300 to S304, refer to the foregoing descriptions of steps S200 to S204 in the embodiment of FIG. 2. Details are not described herein again.

Step S306: The anti-DDoS device recognizes, based on a fingerprint feature database, an OS type corresponding to the first fingerprint feature.

Further, before step S306, the anti-DDoS device may generate the fingerprint feature database in advance. For example, the anti-DDoS device may automatically learn of or analyze, through self-learning, an access request packet in a normal service model to obtain a transport-layer fingerprint feature and/or a network-layer fingerprint feature, or receive a transport-layer fingerprint feature and/or a network-layer fingerprint feature input by a user; and then store the transport-layer fingerprint feature and/or the network-layer fingerprint feature in the fingerprint feature database. In this case, the fingerprint feature database includes a fingerprint feature corresponding to an OS type of a terminal device that is allowed to access the server. Alternatively, the anti-DDoS device may automatically learn of or analyze, through self-learning, an access request packet in an attack service model to obtain a transport-layer fingerprint feature and/or a network-layer fingerprint feature, or receive a transport-layer fingerprint feature and/or a network-layer fingerprint feature input by a user; and then store the transport-layer fingerprint feature and/or the network-layer fingerprint feature in the fingerprint feature database. In this case, the fingerprint feature database includes a fingerprint feature corresponding to an OS type of a terminal device that is not allowed to access the server.

The transport-layer fingerprint feature or the network-layer fingerprint feature in this embodiment of the present disclosure is an inherent system fingerprint feature that each OS has in complying with or using the TCP/IP protocol, and varies with the OS.

The fingerprint feature database in this embodiment of the present disclosure further includes a correspondence between an OS type and a fingerprint feature. In this way, the anti-DDoS device may recognize, based on the fingerprint feature database, the OS type corresponding to the first fingerprint feature.

Step S308. The anti-DDoS device determines, based on a first OS type list or a second OS type list, whether to allow the first access request packet to access the server.

Further, the anti-DDoS device may further create the first OS type list or the second OS type list in advance. The first OS type list includes at least one OS type that is allowed to access the server, and the second OS type list includes at least one OS type that is not allowed to access the server. The first OS type list or the second OS type list may be an OS type configured and input by the user. Alternatively, the first OS type list may be obtained in the following manner: The access request packet in the normal service model is automatically learned of or analyzed through self-learning, to obtain the transport-layer fingerprint feature and/or the network-layer fingerprint feature; and then an OS type corresponding to the fingerprint features/fingerprint feature is obtained. The second OS type list may alternatively be obtained in the following manner: The access request packet in the attack service model is automatically learned of or analyzed through self-learning, to obtain the transport-layer fingerprint feature and/or the network-layer fingerprint feature; and then an OS type corresponding to the fingerprint features/fingerprint feature is obtained.

Then, the anti-DDoS device may perform determining based on the first OS type list. When it is determined that the OS type corresponding to the first fingerprint feature is in the first OS type list, it indicates that the first access request packet is allowed to access the server, and step S310 is performed; when it is determined that the OS type corresponding to the first fingerprint feature is not in the first OS type list, it indicates that the first access request packet is not allowed to access the server, and step S312 is performed. Alternatively, the anti-DDoS device may perform determining based on the second OS type list. When it is determined that the OS type corresponding to the first fingerprint feature is not in the second OS type list, it indicates that the first access request packet is allowed to access the server, and step S310 is performed; when it is determined that the OS type corresponding to the first fingerprint feature is in the second OS type list, it indicates that the first access request packet is not allowed to access the server, and step S312 is performed.

Step S310: The anti-DDoS device passes the first access request packet through to the server.

Step S312: The anti-DDoS device blocks the first access request packet.

Figure 4:
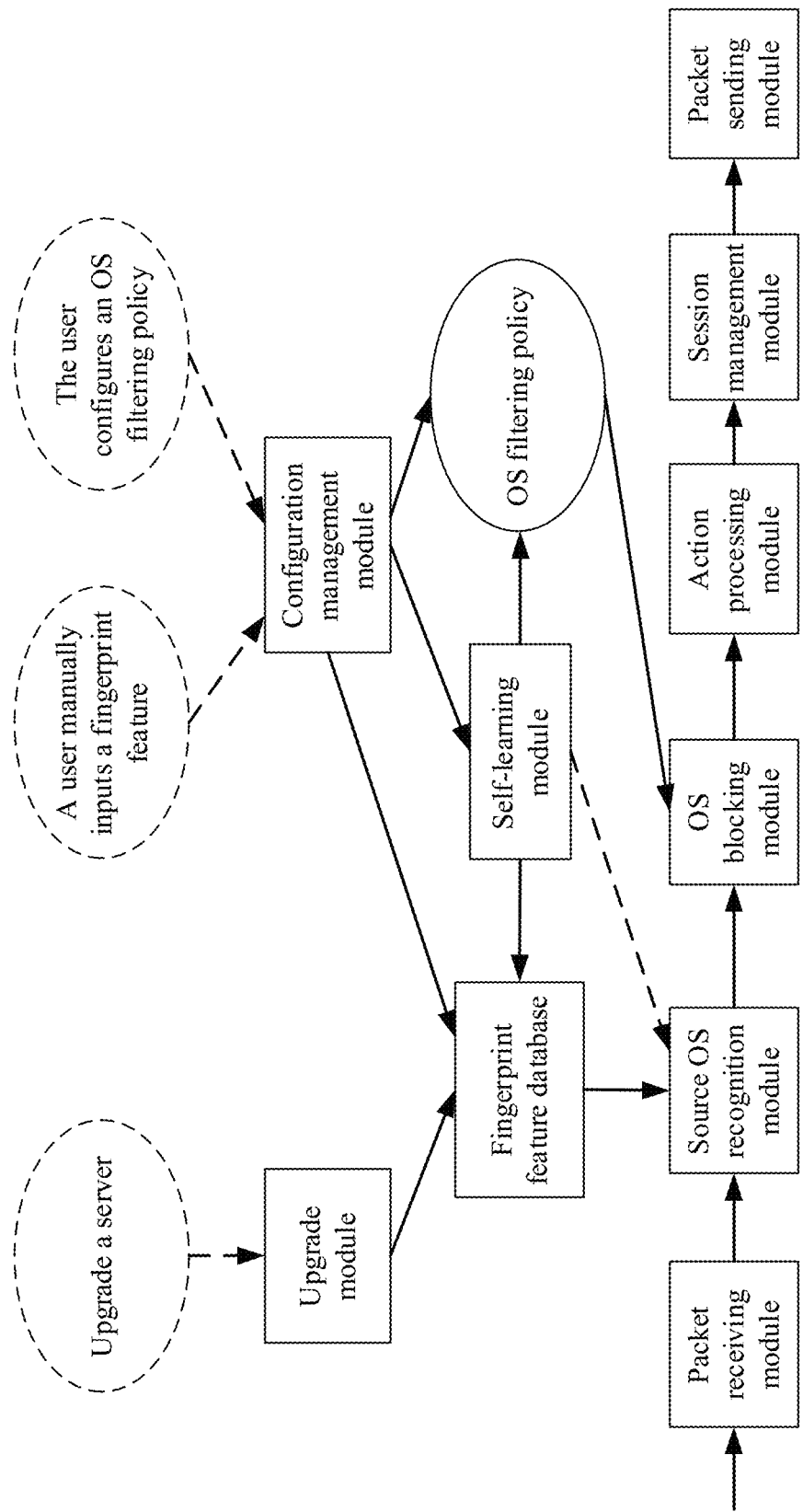
FIG. 4 is a schematic conceptual diagram of a packet processing method according to an embodiment of the present disclosure.

FIG. 4 is a schematic conceptual diagram of a packet processing method according to an embodiment of the present disclosure, and describes how to process a received access request packet from a perspective of internal modules of a protection device. Earlier-stage configuration management and later-stage packet recognition and filtering may be included.

In a configuration management process, a configuration management module may create a fingerprint feature database in a form in which a user manually inputs a fingerprint feature. Alternatively, a fingerprint feature of an access request packet may be obtained through self-learning by using a self-learning module, to create a fingerprint feature database. Alternatively, the two manners may be combined to create a fingerprint feature database.

Further, an upgrade module may be used to upgrade or update a fingerprint feature stored in the fingerprint feature database. For example, the fingerprint feature may be periodically updated through self-learning; or a definition rule for a transport-layer fingerprint feature and/or a network-layer fingerprint feature is updated, and a fingerprint feature database is re-created based on an updated definition rule. The definition rule for a transport-layer fingerprint feature and/or a network-layer fingerprint feature may be specifically that which transport-layer fingerprint feature items and network-layer fingerprint feature items are selected as a recognition basis. A fingerprint feature is configured or self-learned based on the selected fingerprint features, to construct a fingerprint feature database; and a fingerprint feature of a first access request packet is extracted based on the selected fingerprint feature items, to determine whether to pass through or block the packet.

In a possible implementation, the user may alternatively configure an OS blocking policy by using the configuration management module. For example, different transport-layer fingerprint features and/or network-layer fingerprint features may correspond to different OS types, for example, Windows 7/8, Windows 10, Linux 2.4, and Linux 4.1. Then, a user such as a developer or research and development engineer may alternatively directly configure a client OS type list; or a client OS type list may be configured by automatically learning of, through self-learning, an OS type corresponding to a normal service model or an attack service model. An OS type in the client OS type list may be an OS type whose access is allowed or an OS type whose access is forbidden. In this way, the OS blocking policy is configured more flexibly and more rapidly and efficiently, and a user requirement for fast responses can be met in the face of ever-changing DDoS attacks, thereby better preventing and mitigating DDoS attacks and better protecting a server from DDoS attacks.

In a later-stage packet recognition and filtering process, a packet receiving module receives an access request packet; then, a source OS recognition module recognizes the received access request packet based on the fingerprint feature in the fingerprint feature database, to extract a fingerprint feature; and the self-learning module may further recognize an OS type corresponding to a terminal device that sends the access request packet. Then, an OS blocking module analyzes, based on the configured OS blocking policy, whether to block the access request packet. When the access request is allowed, an action processing module may forward the access request packet to a session management module, and the session management module triggers a packet sending module to pass the access request packet through to the server. When the access request is not allowed, the action processing module may directly block the access request packet.

In this embodiment of the present disclosure, information in a transport-layer packet header and/or a network-layer packet header is implemented or generated depending on an OS. In other words, a fingerprint feature (such as TCP header and option features or an IP header feature) in the transport-layer packet header and/or the network-layer packet header is strongly related to an OS type and cannot be modified by a common program. A hacker usually needs to implement forgery by establishing a raw socket or modifying an OS. Modifying an OS means modifying a protocol stack of the OS, and the OS needs to be re-compiled. However, original code of the OS is basically held by the vendor (especially for a current IoT system, an increasing quantity of devices use OSs developed by respective vendors of the devices). Therefore, re-compilation is both highly difficult and costly. This resolves a technical problem in a conventional technology that hackers can evade attack detection with relative ease to make a target service susceptible to DDoS attacks. An anti-DDoS device can accurately recognize whether an access request is valid normal user access by recognizing a transport-layer fingerprint feature and/or a network-layer fingerprint feature of an attack packet, and can well block an abnormal user access request, thereby better preventing and mitigating DDoS attacks and better protecting the server from DDoS attacks.

Figure 5:
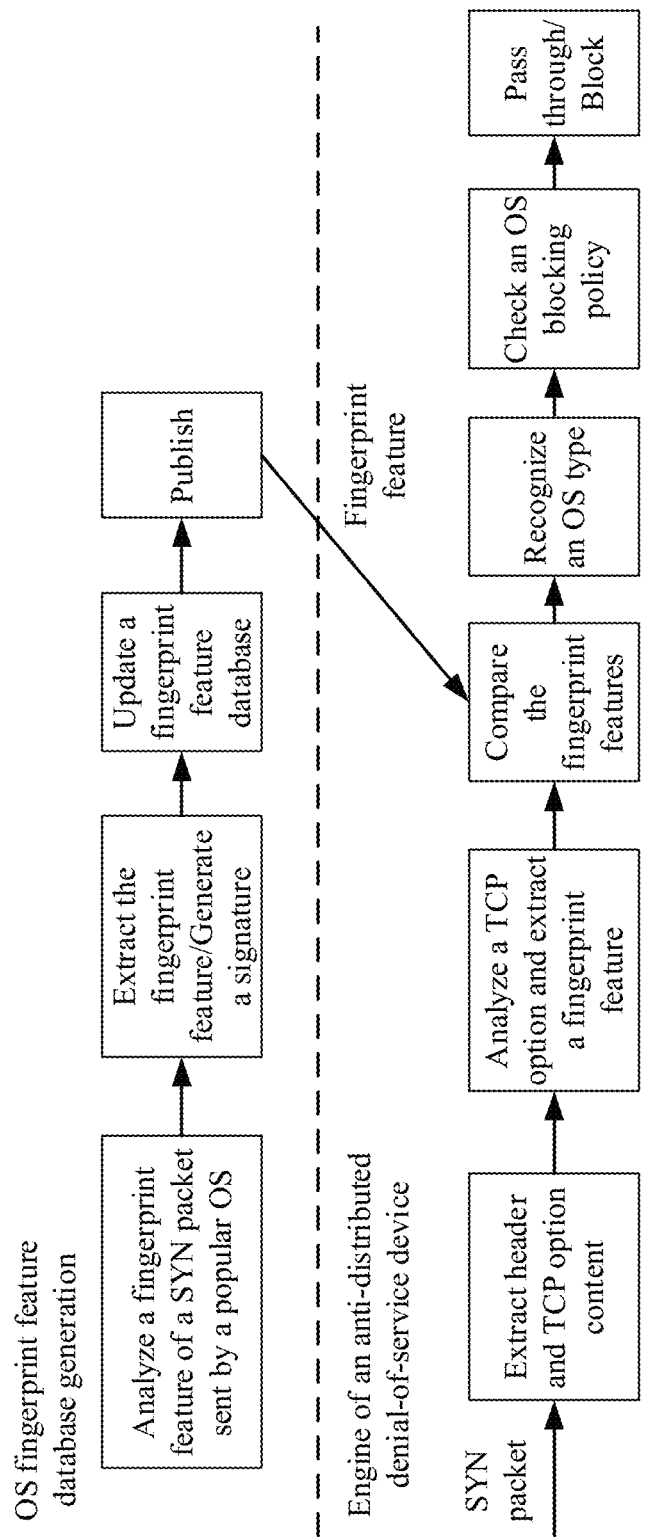
FIG. 5 is a schematic conceptual diagram of a packet processing method according to another embodiment of the present disclosure.

To facilitate better understanding of a principle of the packet processing method provided in the embodiments of the present disclosure, with reference to a schematic conceptual diagram, shown in FIG. 5, of a packet processing method according to another embodiment of the present disclosure, specific descriptions are provided from two aspects: OS feature database generation and how an engine of an anti-DDoS device processes a packet.

In a process of generating an OS feature database, a header and an option of a TCP SYN packet sent by a popular OS may be analyzed first; and then, a key fingerprint feature is extracted or a signature is generated, for example, option sorting information of a TCP option of the SYN packet, Time to live (TTL) information of an IP packet, MSS information, window size value information, window scale information, and other options. The extracted fingerprint feature is formed into a fixed feature and placed or updated to a fingerprint feature database. The fingerprint feature may be published and updated to the anti-DDoS device for use by the engine of the anti-DDoS device.

A process in which the engine of the anti-DDoS device processes a packet may be illustrated by using the following two embodiments (with flowcharts in the accompanying drawings):

Embodiment 1

Figure 6:
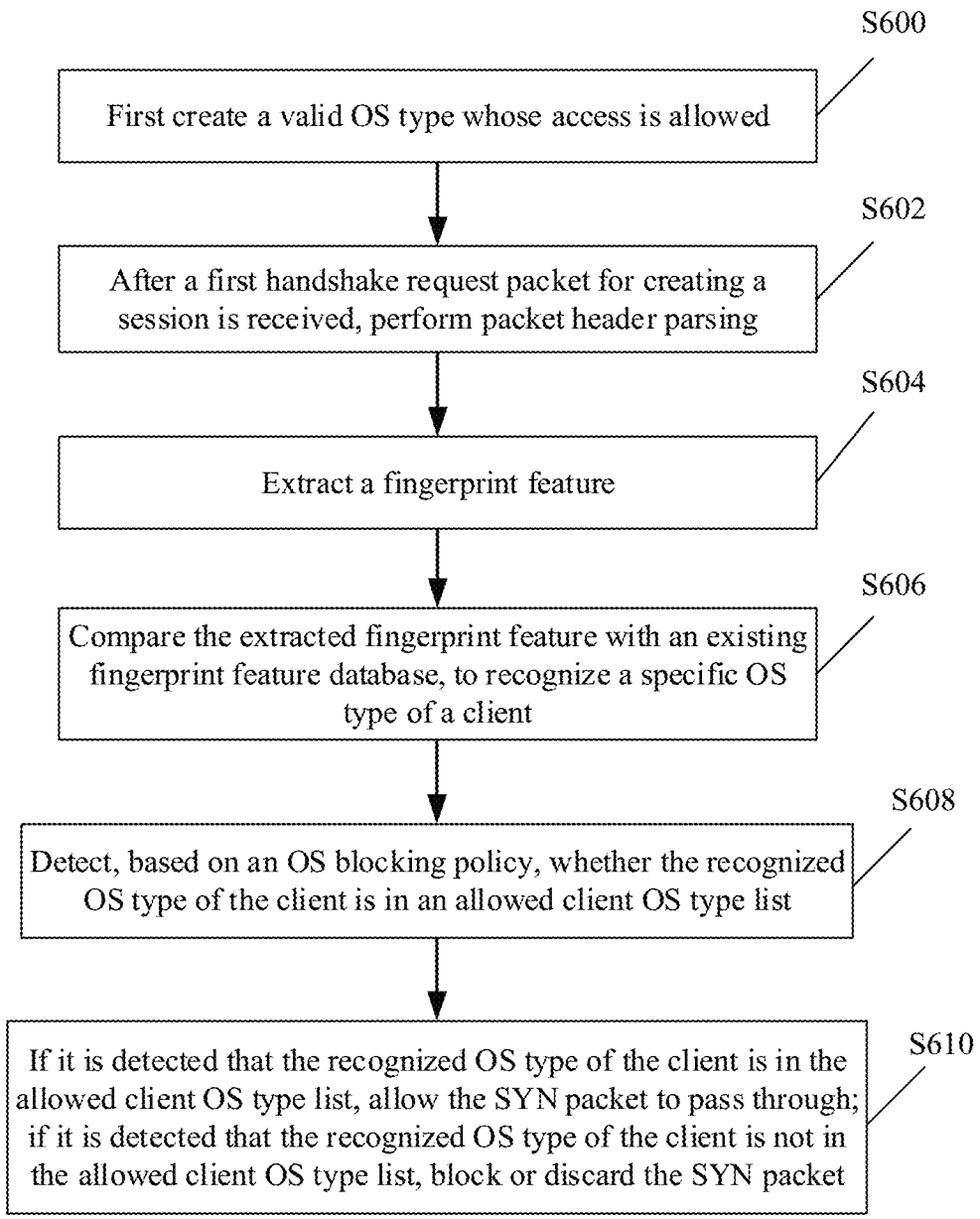
FIG. 6 is a schematic diagram of an embodiment of a packet processing procedure according to the present disclosure.

FIG. 6 is a schematic diagram of an embodiment of a packet processing procedure according to the present disclosure. The packet processing procedure may include the following steps.

Step S600: An anti-DDoS device may first create a valid OS type whose access is allowed.

For example, the OS type whose access is allowed may be an OS type list. The OS type list may be configured by a user. For example, the user manually configures an allowed client OS type list: Windows 7/8 and Windows 10. Alternatively, the anti-DDoS device may perform self-learning in a normal service model and automatically learn of a valid client OS type list (whose access is allowed), for example, Windows 7/8 and Windows 10.

Step S602: After receiving a first handshake request packet for creating a session, that is, a SYN packet, the anti-DDoS device performs packet header parsing, for example, extracts option information.

Step S604: The anti-DDoS device extracts a fingerprint feature, for example, analyzes a TCP option. Further, the anti-DDoS device completes fingerprint feature extraction according to a predefined rule. For example, the predefined rule is to extract option sorting information of a TCP option, TTL information of a packet IP header, and a window size value. Then, the anti-DDoS device extracts fingerprint features of these three items.

Step S606: The anti-DDoS device compares the extracted fingerprint feature with an existing fingerprint feature database, to recognize a specific OS type of a client (which sends the SYN packet), for example, Windows 7/8 or Linux 2.4.

For example, the created valid OS type whose access is allowed includes Windows 7. It is assumed that fingerprint features configured for Windows 7 include the following three items: A TCP option sorting sequence is Maximum segment size (MSS), No-Operation (NOP), window scale, NOP, NOP, and Selective-Acknowledgement (SACK) Permitted; a Time to live (TTL) of a packet IP header is 128; and a window size value is 8192. Then, fingerprint features of the foregoing three items in the SYN packet are extracted. When all the fingerprint features of the foregoing three items are the same as those in the fingerprint feature database, it is recognized that the specific OS type of the client is Windows 7, and access of the packet is allowed and the SYN packet is allowed to pass through. When not all the fingerprint features of the foregoing three items are the same as those in the fingerprint feature database, it is recognized that the specific OS type of the client is not Windows 7. After it is recognized that the specific OS type of the client is not an OS type whose access is allowed, the SYN packet is blocked.

Step S608: The anti-DDoS device detects, based on an OS blocking policy, whether the recognized OS type of the client is in the allowed client OS type list.

Step S610: When it is detected that the recognized OS type of the client is in the allowed client OS type list, allow the SYN packet to pass through; when it is detected that the recognized OS type of the client is not in the allowed client OS type list, block or discard the SYN packet.

Embodiment 2

Figure 7:
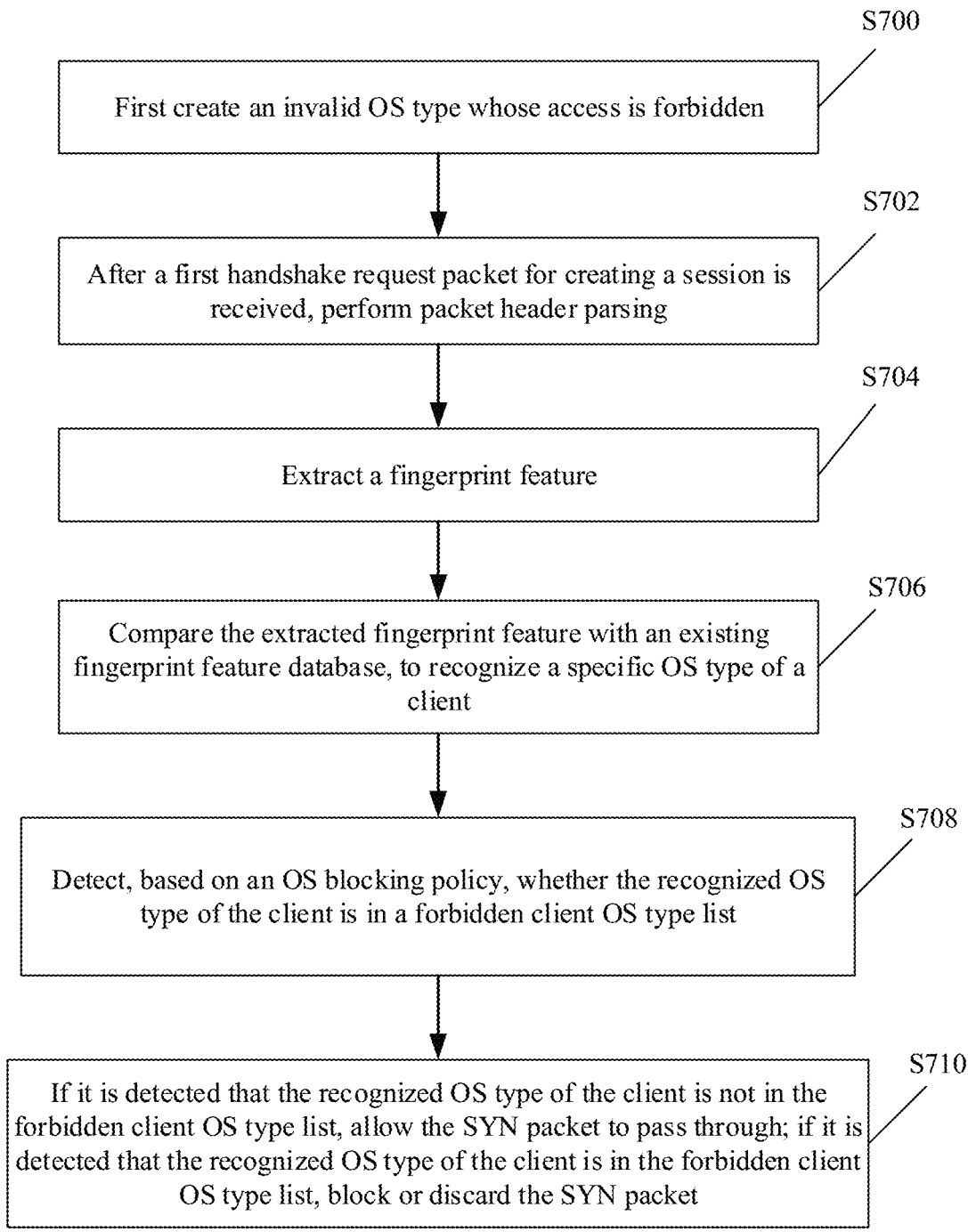
FIG. 7 is a schematic diagram of another embodiment of a packet processing procedure according to the present disclosure.

FIG. 7 is a schematic diagram of another embodiment of a packet processing procedure according to the present disclosure. The packet processing procedure may include the following steps.

Step S700: An anti-DDoS device may first create an invalid OS type whose access is forbidden.

For example, the invalid OS type whose access is forbidden may be an OS type list. The OS type list may be configured by a user. For example, the user manually configures a forbidden client OS type list: Windows 7/8 and Windows 10. Alternatively, a system may perform self-learning in an attack service model and automatically learn of an invalid client OS type list (whose access is forbidden), for example, Windows 7/8 and Windows 10.

Step S702: After receiving a first handshake request packet for creating a session, that is, a SYN packet, the anti-DDoS device performs packet header parsing, for example, extracts option information.

Step S704: The anti-DDoS device extracts a fingerprint feature, for example, analyzes a TCP option. Further, the anti-DDoS device completes fingerprint feature extraction based on a predefined rule. For example, the defined rule is to extract option sorting information of a TCP option and a value of each option. Then, the anti-DDoS device extracts fingerprint features of these two items.

Step S706: The anti-DDoS device compares the extracted fingerprint feature with an existing fingerprint feature database, to recognize a specific OS type of a client (that sends the SYN packet), for example, Windows 7/8 or Linux 2.4.

Step S708: The anti-DDoS device detects, based on an OS blocking policy, whether the recognized OS type of the client is in the forbidden client OS type list.

Step S710: When it is detected that the recognized OS type of the client is not in the forbidden client OS type list, allow the SYN packet to pass through; when it is detected that the recognized OS type of the client is in the forbidden client OS type list, block or discard the SYN packet.

In other words, the eight cases in the following table may exist in the process in which the engine of the anti-DDoS device processes a packet:

|  | List type | List source | Whether a client OS is in the list | Final action |
| --- | --- | --- | --- | --- |
| Case 1 | Define an allowed type list | Configured by a user | Yes | Allow to pass through |
| Case 2 |  |  | No | Block |
| Case 3 |  | Self-learning | Yes | Allow to pass through |
| Case 4 |  |  | No | Block |
| Case 5 | Define a forbidden type list | Configured by a user | Yes | Block |
| Case 6 |  |  | No | Allow to pass through |

-continued

| | List type | List source | Whether a client OS is in the list | Final action |
|---|---|---|---|---|
| Case 7 | | Self-learning | Yes | Block |
| Case 8 | | | No | Allow to pass through |

The following provides descriptions in combination with two business embodiments:

Business Embodiment 1

For example, an anti-DDoS device protects a server of a game that runs in Windows. The game can run only in Windows. An allowed client OS type list that is set based on a client type is Windows 7/8 and Windows 10.

When it is detected that the server is subject to a DDoS attack, the anti-DDoS device is triggered to perform fingerprint feature recognition on OS types of all clients connected to the server of the game (for details, refer to the descriptions in the foregoing embodiments). When it is recognized, through fingerprint recognition, that an OS type of a client is not a Windows 7/8 or Windows 10 system. For example, it is recognized that the OS type is a Linux 2.4 system, a SYN packet is directly blocked, to block access from the client, thereby mitigating the DDoS attack.

Otherwise, when it is recognized that the OS type of the client is a Windows 10 system, the SYN packet is allowed to pass through.

Business Embodiment 2

For example, an anti-DDoS device protects an application server of an app. The app can run only on an Apple iPhone device. An allowed client OS type list that is set based on a client type is iOS.

When it is detected that the application server is subject to a DDoS attack, the anti-DDoS device is triggered to perform fingerprint feature recognition on OS types of all clients connected to the application server (for details, refer to the descriptions in the foregoing embodiments). When it is recognized, through fingerprint recognition, that an OS type of a client is not an iOS system, but is, for example, a Windows 7 system, a SYN packet is directly blocked, to block access from the client, thereby mitigating the DDoS attack.

Otherwise, when it is recognized that the OS type of the client is an iOS (iPhone) device, the SYN packet is allowed to pass through.

When a fingerprint feature is extracted and recognized for each received access request packet, access efficiency of a normal user is affected. By using the foregoing technical means, extraction and recognition of a fingerprint feature are triggered only when it is detected that the server is subject to a DDoS attack. This can well balance efficiency of normal access and mitigation of DDoS attacks.

A transport-layer fingerprint feature and a network-layer fingerprint feature in the embodiments of the present disclosure are inherent system fingerprints of an OS. Different OSs generally have different fingerprint features. Further, the OSs vary in terms of fingerprint features of an IP header and option/a TCP header and option.

The following separately illustrates transport-layer fingerprint features and network-layer fingerprint features in different OSs with reference to FIG. 8 to FIG. 11.

Figure 8:
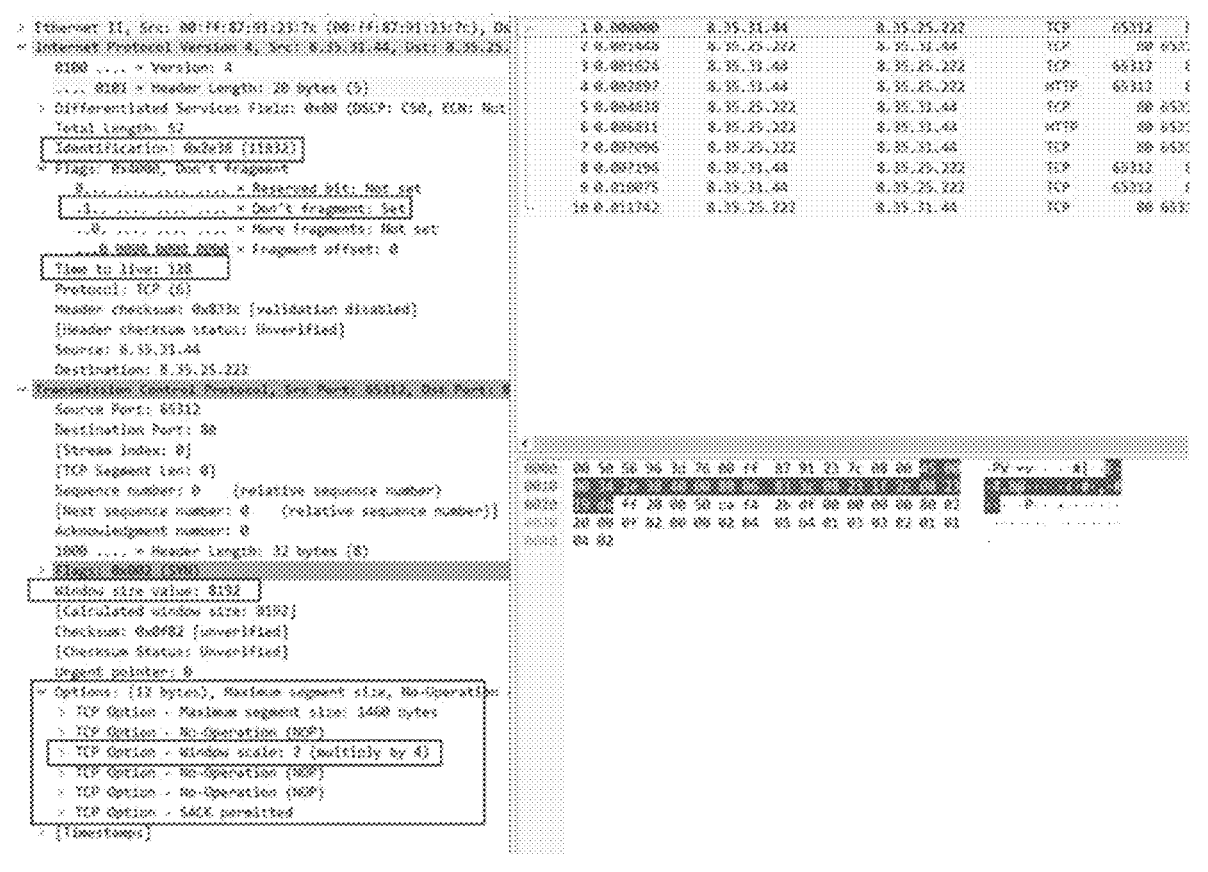

A schematic diagram, shown in FIG. 8, of a fingerprint feature corresponding to an OS according to an embodiment of the present disclosure uses a Windows 7 OS as an example. It can be seen from FIG. 8 that an extracted fingerprint feature of an access request packet sent from Windows 7 based on or in compliance with a TCP/IP protocol includes one or more of the following: a TCP option sorting sequence is Maximum segment size (MSS), No-Operation (NOP), window scale, NOP, NOP, and SACK Permitted; a TTL of a packet IP header is 128; a window size value is 8192; a window scale value is 2; and a DF field is set to 1, and an Identification (ID) field in the IP header is not 0.

Figure 9:
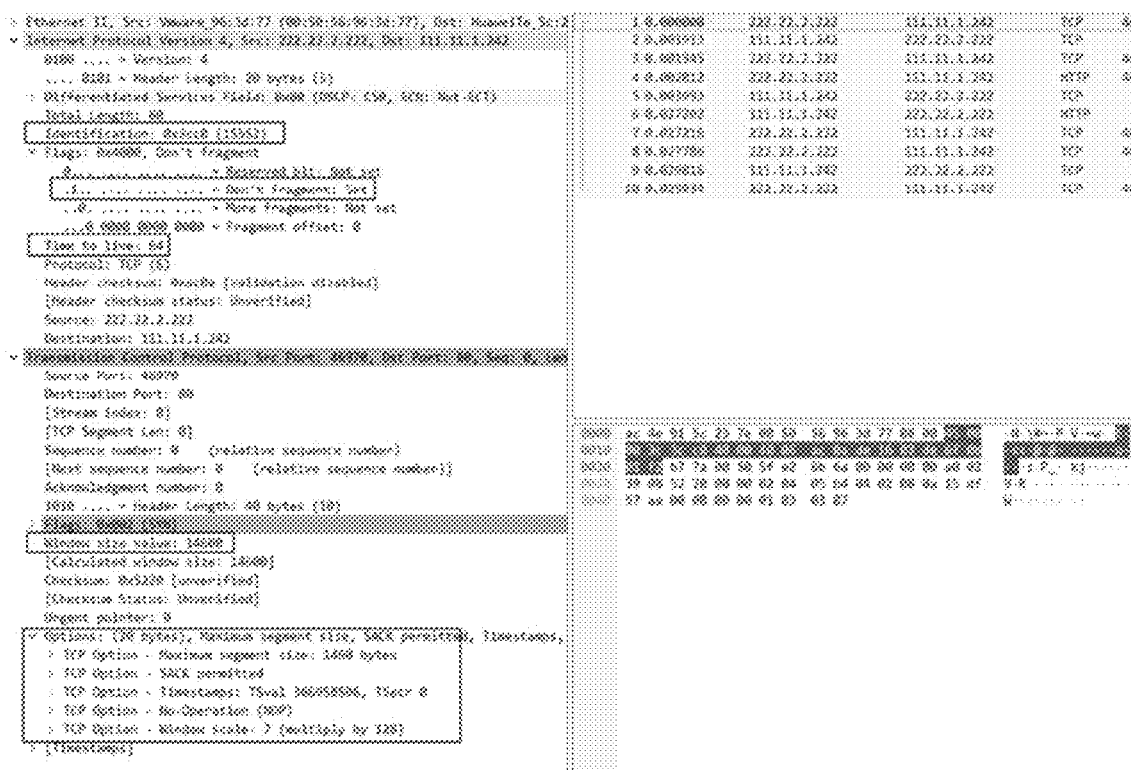
FIG. 9 is a schematic diagram of a fingerprint feature corresponding to an OS according to another embodiment of the present disclosure.

A schematic diagram, shown in FIG. 9, of a fingerprint feature corresponding to an OS according to another embodiment of the present disclosure uses a Linux version 3.1 (CentOS 7.1) OS as an example. It can be seen from FIG. 9 that an extracted fingerprint feature of an access request packet sent from Linux version 3.1 (CentOS 7.1) based on or in compliance with a TCP/IP protocol includes one or more of the following: a TCP option sorting sequence is MSS, SACK Permitted, Timestamp, NOP, and window scale; a TTL of a packet IP header is 64; a window size value is 14600 (MSS×10); a window scale value is 7; and a DF) field is set to 1, and an ID field is not 0.

Figure 10:
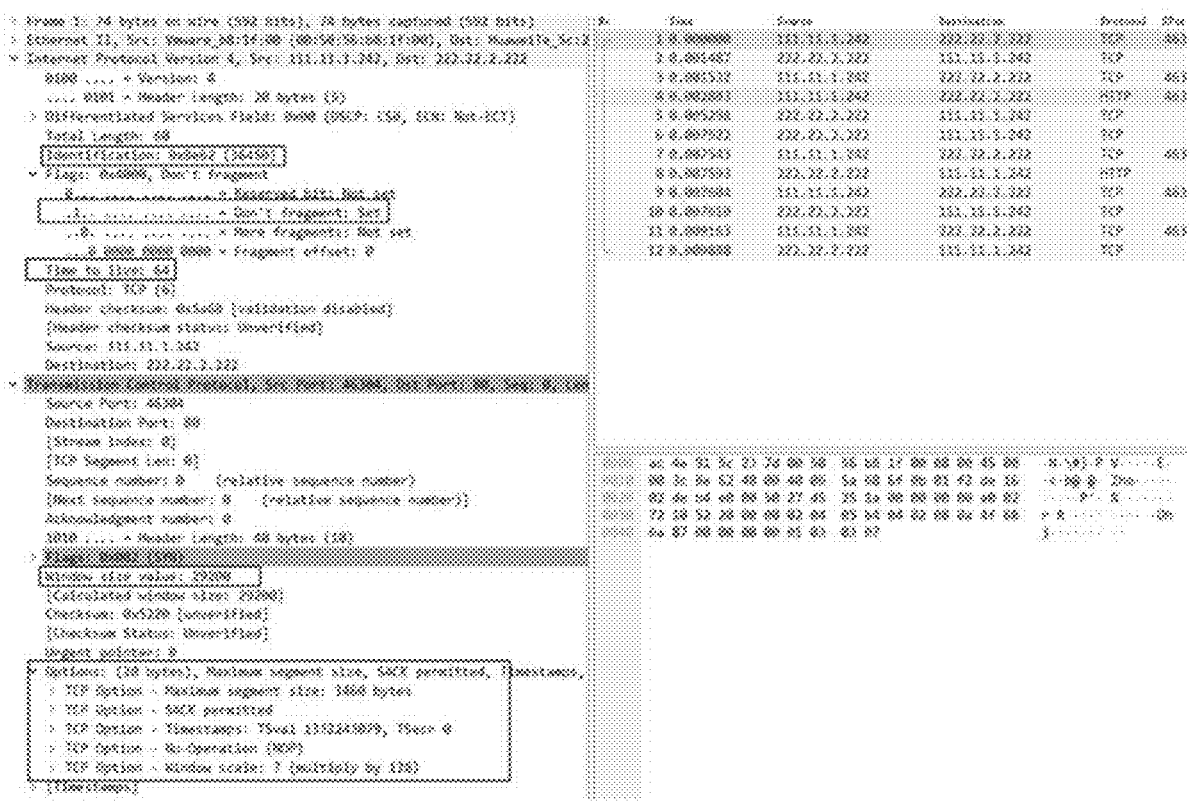
FIG. 10 is a schematic diagram of a fingerprint feature corresponding to an OS according to another embodiment of the present disclosure.

A schematic diagram, shown in FIG. 10, of a fingerprint feature corresponding to an OS according to another embodiment of the present disclosure uses a Linux 4.1 (Kali) OS as an example. It can be seen from FIG. 10 that an extracted fingerprint feature of an access request packet sent from Linux 4.1 (Kali) based on or in compliance with a TCP/IP protocol includes one or more of the following: a TCP option sorting sequence is MSS, SACK Permitted, Timestamp, NOP, and window scale; a TTL of a packet IP header is 64; a window size value is 29200 (MSS×20); a window scale value is 7; and a DF field is set to 1, and an ID field is not 0.

Figure 11:
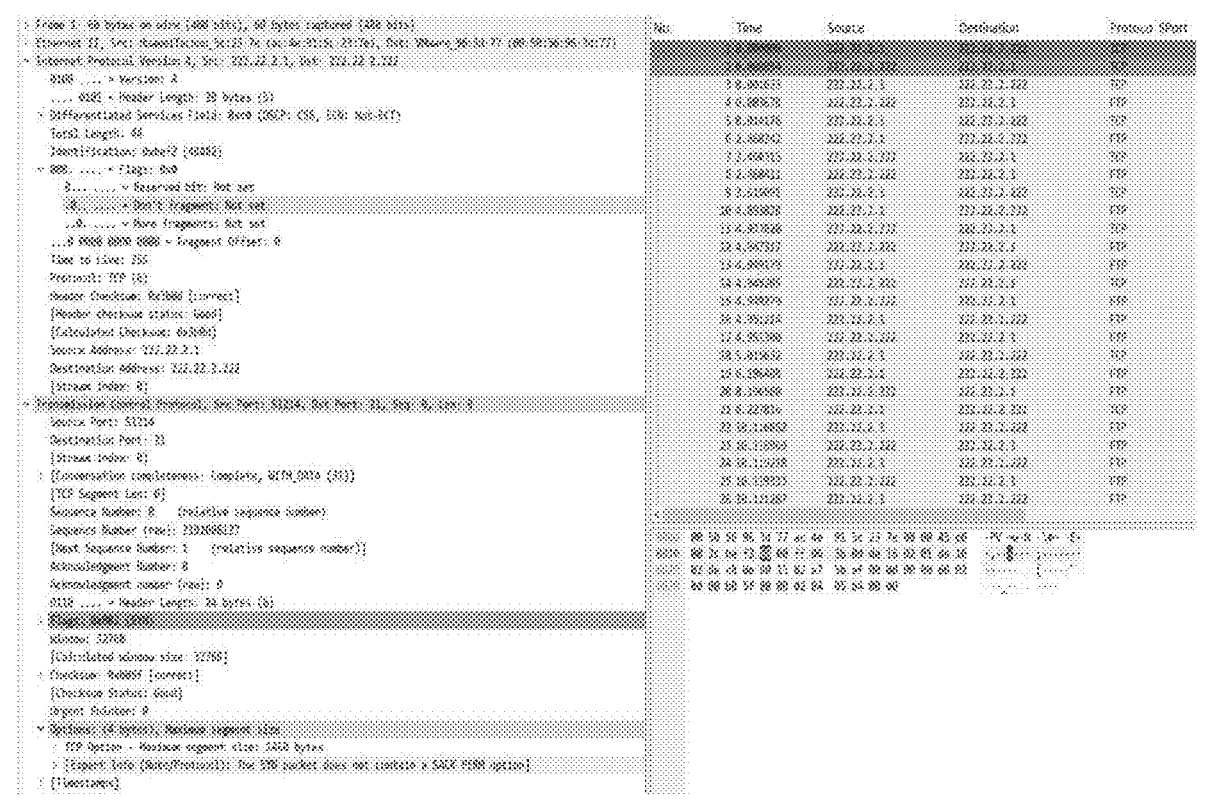

A schematic diagram, shown in FIG. 11, of a fingerprint feature corresponding to an OS according to another embodiment of the present disclosure uses an OS of a Huawei USG6670 gateway device as an example. For an existing IoT system, an increasing quantity of devices use OSs developed by respective vendors of the devices. It can be seen from FIG. 11 that an extracted fingerprint feature of an access request packet sent from the Huawei USG6670 gateway device based on or in compliance with a TCP/IP protocol includes one or more of the following: a TCP option sorting sequence is MSS; a TTL of a packet IP header is 255; a window size value is 32768; there is no window scale field; and a DF field is not set.

Figure 12:
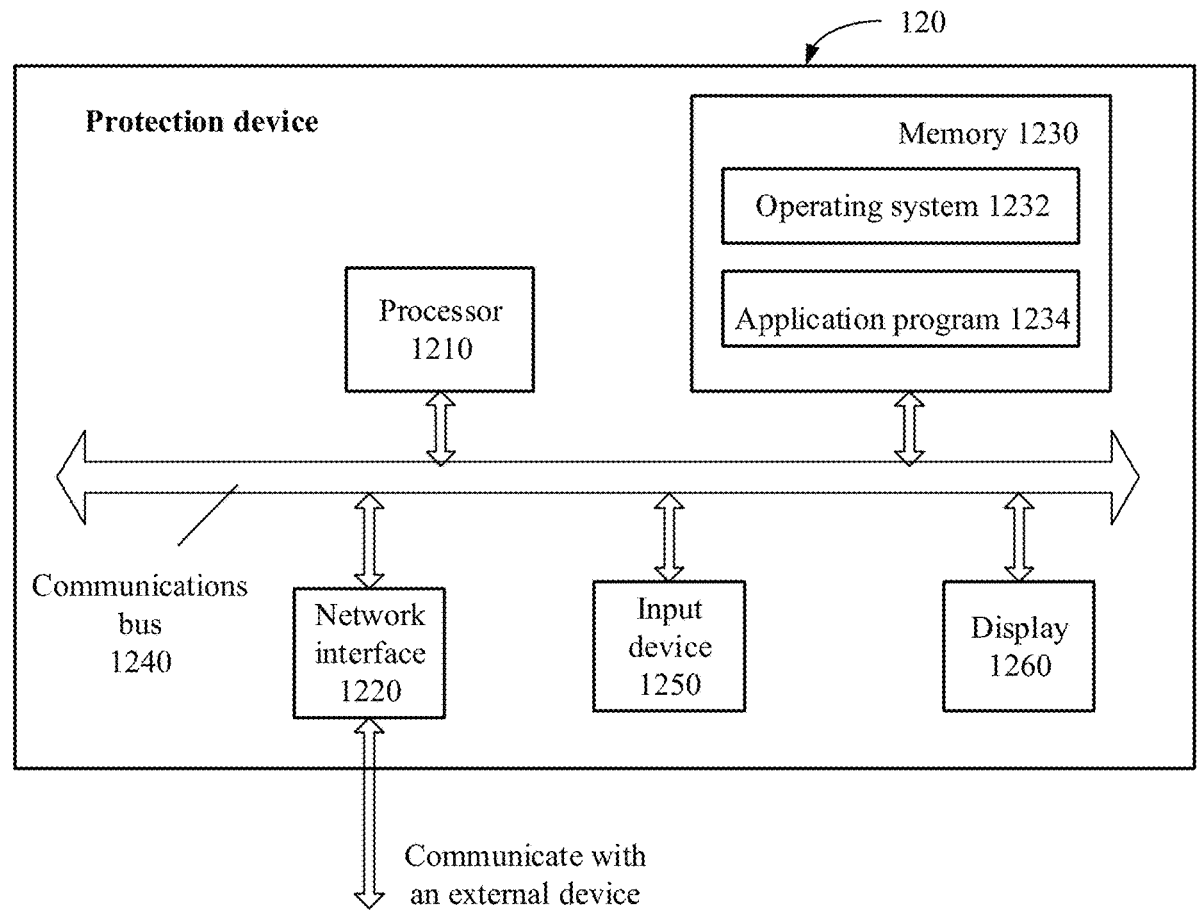
FIG. 12 is a schematic diagram of a structure of a protection device according to an embodiment of the present disclosure.

Next, refer to FIG. 12. FIG. 12 is a schematic diagram of a structure of a protection device according to an embodiment of the present disclosure. The protection device 120 may include a processor 1210, a network interface 1220, a memory 1230, a communications bus 1240, an input device 1250, and a display 1260. The processor 1210, the network interface 1220, the memory 1230, the input device 1250, and the display 1260 communicate with each other by using the communications bus 1240. The input device 1250 may be a device or a component that can obtain a user operation, for example, a touchscreen, a mouse, or a keyboard. The display 1260 may display some prompt information, so that a user interacts with the protection device 120 based on the prompt information. For example, information about a blocked access request packet may be displayed, to be viewed by a user. The memory 1230 includes, but is not limited to, a random-access memory (RAM) and a read-only memory (ROM). The memory 1230 may store an OS (program) 1232 and an application program 1234. The network interface 1220 is configured to communicate with another device, for example, receiving an access request packet sent by a terminal device and sending the access request packet to a server. The processor 1210 may be one or more central processing units (CPU). When the processor 1210 is one CPU, the CPU may be a single-core CPU or may be a multi-core CPU. The processor 1210 runs the OS 1232 to provide a software running environment. In the software running environment, the processor 1210 may invoke the application program 1234 to perform operations related to packet processing. Details are as follows:

The network interface 1220 is configured to receive a first access request packet, where the first access request packet includes a packet sent based on a TCP/IP protocol, and a destination of the first access request packet is a server protected by the protection device.

The processor 1210 is configured to invoke a stored computer program (for example, the application program 1234) to perform the following operations: extracting a first fingerprint feature from a transport-layer packet header and/or a network-layer packet header of the first access request packet, where the first fingerprint feature corresponds to an OS type of a terminal device that sends the first access request packet; and recognizing the first fingerprint feature based on a fingerprint feature database to determine whether to allow the first access request packet to access the server, where the fingerprint feature database includes a fingerprint feature corresponding to an OS type of a terminal device that is allowed to access the server and/or a fingerprint feature corresponding to an OS type of a terminal device that is not allowed to access the server; and when the first access request packet is allowed to access the server, allowing the first access request packet to pass through; or when the first access request packet is not allowed to access the server, blocking the first access request packet.

It should be noted that, in the embodiment of FIG. 12, as an example for description, the protection device 120 includes the memory 1230. However, the protection device 120 in this embodiment of the present disclosure may alternatively not include the memory 1230. The stored computer program may be stored at a cloud server end in a form of cloud storage, and the operations related to packet processing may be performed by downloading and executing the stored computer program.

In a possible implementation, the fingerprint feature database includes a fingerprint feature corresponding to an OS type of a terminal device that is allowed to access the server, and the recognizing, by the processor 1210, the first fingerprint feature based on a fingerprint feature database to determine whether to allow the first access request packet to access the server may specifically include: determining whether the fingerprint feature database includes the first fingerprint feature; and when the fingerprint feature database includes the first fingerprint feature, determining to allow the first access request packet to access the server; or when the fingerprint feature database does not include the first fingerprint feature, determining not to allow the first access request packet to access the server.

In a possible implementation, before the network interface 1220 receives the first access request packet, the input device 1250 may receive a transport-layer fingerprint feature and/or a network-layer fingerprint feature input by a user, and store the input fingerprint features/fingerprint feature in the fingerprint feature database; or the processor 1210 is further configured to: before the network interface 1220 receives the first access request packet, analyze a second access request packet in a normal service model to obtain a transport-layer fingerprint feature and/or a network-layer fingerprint feature, and store the fingerprint features/fingerprint feature obtained through analysis in the fingerprint feature database.

In a possible implementation, the fingerprint feature database includes a fingerprint feature corresponding to an OS type of a terminal device that is not allowed to access the server, and the recognizing, by the processor 1210, the first fingerprint feature based on a fingerprint feature database to determine whether to allow the first access request packet to access the server may specifically include: determining, by the processor, whether the fingerprint feature database includes the first fingerprint feature; and when the fingerprint feature database includes the first fingerprint feature, determining not to allow the first access request packet to access the server; or when the fingerprint feature database does not include the first fingerprint feature, determining to allow the first access request packet to access the server.

In a possible implementation, before the network interface 1220 receives the first access request packet, the input device 1250 may receive a transport-layer fingerprint feature and/or a network-layer fingerprint feature input by a user, and store the input fingerprint features/fingerprint feature in the fingerprint feature database; or the processor 1210 is further configured to: before the network interface 1220 receives the first access request packet, analyze a third access request packet in an attack service model to obtain a transport-layer fingerprint feature and/or a network-layer fingerprint feature, and store the fingerprint features/fingerprint feature obtained through analysis in the fingerprint feature database.

In a possible implementation, the fingerprint feature database includes a fingerprint feature corresponding to an OS type of a terminal device that is allowed to access the server and a fingerprint feature corresponding to an OS type of a terminal device that is not allowed to access the server, and the recognizing, by the processor 1210, the first fingerprint feature based on a fingerprint feature database to determine whether to allow the first access request packet to access the server may specifically include: recognizing, by the processor 1210 based on the fingerprint feature database, an OS type corresponding to the first fingerprint feature, where the fingerprint feature database includes a correspondence between an OS type and a fingerprint feature; and determining, based on a first OS type list or a second OS type list, whether to allow the first access request packet to access the server, where the first OS type list includes at least one OS type that is allowed to access the server, and the second OS type list includes at least one OS type that is not allowed to access the server.

In a possible implementation, the processor 1210 may alternatively trigger and perform, only when it is detected that the server is subject to a DDoS attack, the step of extracting a first fingerprint feature from a transport-layer packet header and/or a network-layer packet header of the first access request packet.

Further, for a packet processing procedure and achieved beneficial effects of the protection device 120, refer to detailed descriptions in the embodiments of FIG. 1 to FIG. 11. Details are not described herein again.

Figure 13:
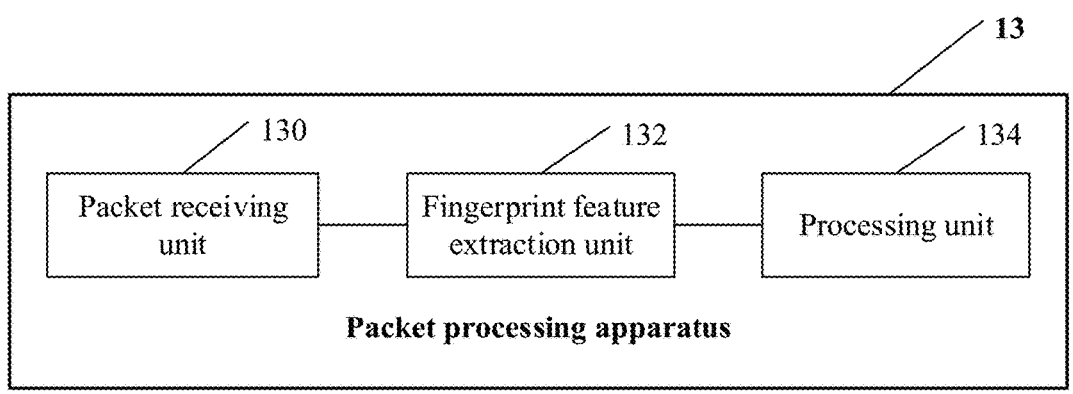
FIG. 13 is a schematic diagram of a structure of a packet processing apparatus according to an embodiment of the present disclosure.

Next, correspondingly, refer to FIG. 13. FIG. 13 is a schematic diagram of a structure of a packet processing apparatus according to an embodiment of the present disclosure. The packet processing apparatus 13 may include a packet receiving unit 130, a fingerprint feature extraction unit 132, and a processing unit 134.

The packet receiving unit 130 is configured to receive a first access request packet, where the first access request packet includes a packet sent based on a TCP/IP protocol, and a destination of the first access request packet is a server protected by the packet processing apparatus.

The fingerprint feature extraction unit 132 is configured to extract a first fingerprint feature from a transport-layer packet header and/or a network-layer packet header of the first access request packet, where the first fingerprint feature corresponds to an OS type of a terminal device that sends the first access request packet.

The processing unit 134 is configured to recognize the first fingerprint feature based on a fingerprint feature database to determine whether to allow the first access request packet to access the server, where the fingerprint feature database includes a fingerprint feature corresponding to an OS type of a terminal device that is allowed to access the server and/or a fingerprint feature corresponding to an OS type of a terminal device that is not allowed to access the server, where when the first access request packet is allowed to access the server, the processing unit allows the first access request packet to pass through; or when the first access request packet is not allowed to access the server, the processing unit blocks the first access request packet.

In a possible implementation, the fingerprint feature database may include a fingerprint feature corresponding to an OS type of a terminal device that is allowed to access the server, and the processing unit 134 may be further configured to: determine whether the fingerprint feature database includes the first fingerprint feature; and when the fingerprint feature database includes the first fingerprint feature, determine to allow the first access request packet to access the server; or when the fingerprint feature database does not include the first fingerprint feature, determine not to allow the first access request packet to access the server.

In a possible implementation, the packet processing apparatus 13 may further include: a first feature receiving unit configured to: before the packet receiving unit 130 receives the first access request packet, receive an input transport-layer fingerprint feature and/or network-layer fingerprint feature, and store the input fingerprint features/fingerprint feature in the fingerprint feature database; or a first feature analysis unit configured to: before the packet receiving unit 130 receives the first access request packet, analyze a second access request packet in a normal service model to obtain a transport-layer fingerprint feature and/or a network-layer fingerprint feature, and store the fingerprint features/fingerprint feature obtained through analysis in the fingerprint feature database.

In a possible implementation, the fingerprint feature database includes a fingerprint feature corresponding to an OS type of a terminal device that is not allowed to access the server, and the processing unit 134 may be further configured to: determine whether the fingerprint feature database includes the first fingerprint feature; and when the fingerprint feature database includes the first fingerprint feature, determine not to allow the first access request packet to access the server; or when the fingerprint feature database does not include the first fingerprint feature, determine to allow the first access request packet to access the server.

In a possible implementation, the packet processing apparatus 13 may further include: a second feature receiving unit configured to: before the packet receiving unit 130 receives the first access request packet, receive an input transport-layer fingerprint feature and/or network-layer fingerprint feature, and store the input fingerprint features/fingerprint feature in the fingerprint feature database; or a second feature analysis unit configured to: before the packet receiving unit 130 receives the first access request packet, analyze a third access request packet in an attack service model to obtain a transport-layer fingerprint feature and/or a network-layer fingerprint feature, and store the fingerprint features/fingerprint feature obtained through analysis in the fingerprint feature database.

In a possible implementation, the fingerprint feature database may include a fingerprint feature corresponding to an OS type of a terminal device that is allowed to access the server and a fingerprint feature corresponding to an OS type of a terminal device that is not allowed to access the server, and the processing unit 134 may be further configured to: recognize, based on the fingerprint feature database, an OS type corresponding to the first fingerprint feature, where the fingerprint feature database includes a correspondence between an OS type and a fingerprint feature; and determine, based on a first OS type list or a second OS type list, whether to allow the first access request packet to access the server, where the first OS type list includes at least one OS type that is allowed to access the server, and the second OS type list includes at least one OS type that is not allowed to access the server.

In a possible implementation, the fingerprint feature extraction unit 132 may alternatively trigger and perform, only when it is detected that the server is subject to a DDoS attack, the step of extracting a first fingerprint feature from a transport-layer packet header and/or a network-layer packet header of the first access request packet.

Further, for a packet processing procedure and achieved beneficial effects of the packet processing apparatus 13, refer to detailed descriptions in the embodiments of FIG. 1 to FIG. 11. Details are not described herein again.

Figure 14:
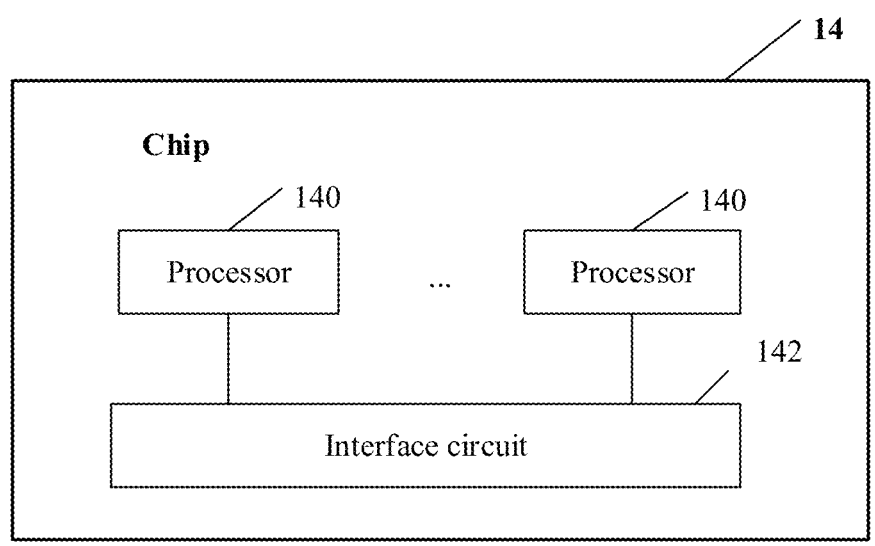
FIG. 14 is a schematic diagram of a structure of a chip according to an embodiment of the present disclosure.

Next, refer to FIG. 14. FIG. 14 is a schematic diagram of a structure of a chip according to an embodiment of the present disclosure. The chip 14 may include at least one processor 140 and an interface circuit 142.

The processor 140 may be configured to: after a first access request packet is input through the interface circuit 142, execute a computer program stored in a memory to perform the following steps: extracting a first fingerprint feature from a transport-layer packet header and/or a network-layer packet header of the first access request packet, where the first fingerprint feature corresponds to an OS type of a terminal device that sends the first access request packet, the first access request packet includes a packet sent based on a TCP/IP protocol, and a destination of the first access request packet is a server protected by the chip; recognizing the first fingerprint feature based on a fingerprint feature database to determine whether to allow the first access request packet to access the server, where the fingerprint feature database includes a fingerprint feature corresponding to an OS type of a terminal device that is allowed to access the server or a fingerprint feature corresponding to an OS type of a terminal device that is not allowed to access the server; and when the first access request packet is allowed to access the server, allowing the first access request packet to pass through; or when the first access request packet is not allowed to access the server, blocking the first access request packet.

In a possible implementation, the fingerprint feature database includes a fingerprint feature corresponding to an OS type of a terminal device that is allowed to access the server, and the recognizing, by the processor 140, the first fingerprint feature based on a fingerprint feature database to determine whether to allow the first access request packet to access the server may specifically include: determining whether the fingerprint feature database includes the first fingerprint feature; and when the fingerprint feature database includes the first fingerprint feature, determining to allow the first access request packet to access the server; or when the fingerprint feature database does not include the first fingerprint feature, determining not to allow the first access request packet to access the server.

In a possible implementation, before the first access request packet is input through the interface circuit 142, the processor 140 may further perform the following operations: storing a received input transport-layer fingerprint feature and/or network-layer fingerprint feature in the fingerprint feature database; or analyzing a second access request packet in a normal service model to obtain a transport-layer fingerprint feature and/or a network-layer fingerprint feature, and storing the fingerprint features/fingerprint feature obtained through analysis in the fingerprint feature database.

In a possible implementation, the fingerprint feature database includes a fingerprint feature corresponding to an OS type of a terminal device that is not allowed to access the server, and the recognizing, by the processor 140, the first fingerprint feature based on a fingerprint feature database to determine whether to allow the first access request packet to access the server may specifically include: determining whether the fingerprint feature database includes the first fingerprint feature; and when the fingerprint feature database includes the first fingerprint feature, determining not to allow the first access request packet to access the server; or when the fingerprint feature database does not include the first fingerprint feature, determining to allow the first access request packet to access the server.

In a possible implementation, before the first access request packet is input through the interface circuit 142, the processor 140 may further perform the following operations: storing a received input transport-layer fingerprint feature and/or network-layer fingerprint feature in the fingerprint feature database; or analyzing a third access request packet in an attack service model to obtain a transport-layer fingerprint feature and/or a network-layer fingerprint feature, and storing the fingerprint features/fingerprint feature obtained through analysis in the fingerprint feature database.

In a possible implementation, the processor 140 may alternatively trigger and perform, only when it is detected that the server is subject to a DDoS attack, the step of extracting a first fingerprint feature from a transport-layer packet header and/or a network-layer packet header of the first access request packet.

In a possible implementation, the first access request packet in this embodiment of the present disclosure includes a SYN packet.

Further, for a packet processing procedure and achieved beneficial effects of the chip 14, refer to detailed descriptions in the embodiments of FIG. 1 to FIG. 11. Details are not described herein again.

A person skilled in the art can appreciate that functions described in combination with various illustrative logical blocks, modules, and algorithm steps disclosed and described herein may be implemented by hardware, software, firmware, or any combination thereof. When implemented by software, the functions described by various illustrative logical blocks, modules, and steps may be stored or transmitted as one or more instructions or codes on a computer-readable medium and executed by a hardware-based processing unit. The computer-readable medium may include a computer-readable storage medium corresponding to a tangible medium, such as a data storage medium, or any communication medium that facilitates transmission of a computer program from one place to another (for example, based on a communication protocol). In this manner, the computer-readable medium may be generally corresponding to: (1) a non-transitory tangible computer-readable storage medium, or (2) a communication medium such as a signal or a carrier. The data storage medium may be any available medium that can be accessed by one or more computers or one or more processors to retrieve instructions, code, and/or data structures for implementing the technologies described in the present disclosure. A computer program product may include a computer-readable medium.

By way of example and not limitation, such computer-readable storage media may include a RAM, a ROM, an Electrically Erasable Programmable ROM (EEPROM), a compact disc (CD)-ROM or another optical disc storage apparatus, a magnetic disk storage apparatus or another magnetic storage apparatus, a flash memory, or any other medium that can store program code in a form of an instruction or a data structure and can be accessed by a computer. In addition, any connection is appropriately referred to as a computer-readable medium. For example, when instructions are sent from a website, a server, or another remote source by using a coaxial cable, an optical cable, a twisted pair, a digital subscriber line (DSL), or a wireless technology such as infrared, radio, and microwave, the coaxial cable, the optical cable, the twisted pair, the DSL, or the wireless technology such as infrared, radio, and microwave is included in a definition of a medium. However, it should be understood that the computer-readable storage medium and the data storage medium may not include a connection, a carrier, a signal, or another transitory medium, but actually mean non-transitory tangible storage media. A disk and an optical disc used in this specification include a CD, a laser disc, an optical disc, a digital versatile disc (DVD), and a Blu-ray disc, where the disk generally magnetically reproduces data, and the optical disc optically reproduces data by using a laser. A combination of the foregoing objects shall further be included in the scope of the computer-readable medium.

The instructions may be executed by one or more processors such as one or more digital signal processors (DSPs), a general microprocessor, an application-specific integrated circuit (ASIC), a field-programmable gate array (FPGA), or an equivalent integrated or discrete logic circuit. Therefore, the term "processor" used in this specification may refer to the foregoing structure, or any other structure that may be applied to implementation of the technologies described in this specification. Moreover, in some aspects, the functions described in the various illustrative logical blocks, modules, and steps described herein may be provided within dedicated hardware and/or software modules configured to perform encoding and decoding, or incorporated into a combined codec. In addition, the technologies may be completely implemented in one or more circuits or logic elements.

The technologies of the present disclosure may be implemented in various apparatuses or devices, including wireless handheld phones, integrated circuits (ICs), or a group of ICs (for example, a chip set). Various components, modules, or units are described in the present disclosure to emphasize functional aspects of the apparatus for performing the disclosed technologies, but are not necessarily implemented by different hardware units. Actually, as described above, various units may be combined into a codec hardware unit in combination with appropriate software and/or firmware, or may be provided by interoperable hardware units (including the one or more processors described above).

The foregoing descriptions are merely examples of specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A packet processing method implemented by a protection device, the packet processing method comprising:
   configuring the protection device to protect a server;
   receiving from a terminal device a first access request packet comprising a packet that is communicated based on Transmission Control Protocol/Internet Protocol (TCP/IP) and that is destined for the server;
   extracting a first fingerprint feature from a transport-layer packet header and/or a network-layer packet header of the first access request packet, wherein the first fingerprint feature corresponds to a first operating system (OS) type of the terminal device;
   recognizing the first fingerprint feature based on a fingerprint feature database to determine whether to allow the first access request packet to access the server, wherein the fingerprint feature database comprises a second fingerprint feature corresponding to a second OS type of the terminal device that is allowed to access the server;
   determining whether the fingerprint feature database comprises the first fingerprint feature;
   allowing, when the fingerprint feature database comprises the first fingerprint feature, the first access request packet to access the server;
   disallowing, when the fingerprint feature database does not comprise the first fingerprint feature, the first access request packet to access the server;
   allowing, when the first access request packet is allowed to access the server, the first access request packet to pass through; and
   blocking, when the first access request packet is not allowed to access the server, the first access request packet.

2. The method according to claim 1, further comprising:
   receiving an input comprising a transport-layer fingerprint feature and/or a network-layer fingerprint feature prior to receiving the first access request packet, and storing the transport-layer fingerprint feature and/or the network-layer fingerprint feature in the fingerprint feature database; or
   analyzing a second access request packet in a normal service model to obtain the transport-layer fingerprint feature and/or the network-layer fingerprint feature, and storing the transport-layer fingerprint feature and/or the network-layer fingerprint feature in the fingerprint feature database.

3. The method according to claim 1, further comprising:
   recognizing, based on the fingerprint feature database, the first OS type corresponding to the first fingerprint feature; and
   determining, based on a first OS type list or a second OS type list, whether to allow the first access request packet to access the server, wherein the first OS type list comprises at least one of the second OS type that is allowed to access the server, and the second OS type list comprises at least one of the third OS type that is not allowed to access the server.

4. The method according to claim 1, wherein the first fingerprint feature and the second fingerprint feature in the fingerprint feature database are transport-layer fingerprint features, and wherein the transport-layer fingerprint features comprise one or more of the following:
   option sorting information of a TCP option;
   maximum segment size information or window size information;
   window scale information; and
   don't fragment (DF) flag bit information.

5. The method according to claim 1, wherein the first fingerprint feature and the second fingerprint feature in the fingerprint feature database are network-layer fingerprint features, and wherein the network-layer fingerprint features comprise one or more of the following:
   time-to-live (TTL) information of an IP packet; and
   IP header identification information.

6. The method according to claim 1, further comprising detecting the server is subject to a distributed denial-of-service (DDoS) attack prior to determining whether to allow the first access request packet to access the server.

7. A protection device comprising:
   a network interface configured to receive a first access request packet comprising a packet that is communicated based on Transmission Control Protocol/Internet Protocol (TCP/IP) and that is destined for a server protected by the protection device; and
   at least one processor coupled to the network interface and configured to:
     extract a first fingerprint feature from a transport-layer packet header and/or a network-layer packet header of the first access request packet, wherein the first fingerprint feature corresponds to a first OS type of a terminal device that transmitted the first access request packet;
     recognize the first fingerprint feature based on a fingerprint feature database to determine whether to allow the first access request packet to access the server, wherein the fingerprint feature database comprises a second fingerprint feature corresponding to a second OS type of the terminal device that is allowed to access the server; and
     allow, when the fingerprint feature database comprises the first fingerprint feature, the first access request packet to access the server;
     disallow, when the fingerprint feature database does not comprise the first fingerprint feature, the first access request packet to access the server;
     allow, when the first access request packet is allowed to access the server, the first access request packet to pass through; and block, when the first access request packet is not allowed to access the server, the first access request packet.

8. The protection device according to claim 7, wherein the protection device further comprises an input device; and the input device is configured to:
receive a transport-layer fingerprint feature and/or a network-layer fingerprint feature prior to receiving the first access request packet, and
store the transport-layer fingerprint feature and/or the network-layer fingerprint feature in the fingerprint feature database.

9. The protection device according to claim 7, wherein the instructions when executed by the at least one processor further cause the device to:
analyze, prior to receiving the first access request packet, a second access request packet in a normal service model to obtain a transport-layer fingerprint feature and/or a network-layer fingerprint feature; and
store the transport-layer fingerprint feature and/or the network-layer fingerprint feature in the fingerprint feature database.

10. The protection device according to claim 7, wherein the instructions when executed by the at least one processor further cause the device to:
recognize, based on the fingerprint feature database, the first OS type corresponding to the first fingerprint feature; and
determine, based on a first OS type list or a second OS type list, whether to allow the first access request packet to access the server, wherein the first OS type list comprises at least one OS type that is allowed to access the server, and wherein the second OS type list comprises at least one of the third OS type that is not allowed to access the server.

11. The protection device according to claim 7, wherein the first fingerprint feature and the second fingerprint feature in the fingerprint feature database are transport-layer fingerprint features, and wherein the transport-layer fingerprint features comprise one or more of the following:
option sorting information of a TCP option;
maximum segment size information;
window size information;
window scale information; or
don't fragment (DF) flag bit information.

12. The protection device according to claim 7, wherein the first fingerprint feature and the second fingerprint feature in the fingerprint feature database are network-layer fingerprint features, and wherein the network-layer fingerprint features comprise one or more of the following:
time-to-live (TTL) information of an IP packet; or
IP header identification information.

13. The protection device according to claim 7, wherein the instructions when executed by the at least one processor further cause the device to detect the server is subject to a distributed denial-of-service (DDoS) attack.

14. A packet processing method implemented by a protection device, the packet processing method comprising:
configuring the protection device to protect a server;
receiving from a terminal device a first access request packet comprising a packet that is communicated based on Transmission Control Protocol/Internet Protocol (TCP/IP) and that is destined for the server;
extracting a first fingerprint feature from a transport-layer packet header and/or a network-layer packet header of the first access request packet, wherein the first fingerprint feature corresponds to a first operating system (OS) type of the terminal device;
recognizing the first fingerprint feature based on a fingerprint feature database to determine whether to allow the first access request packet to access the server, wherein the fingerprint feature database comprises a second fingerprint feature corresponding to a second OS type of the terminal device that is not allowed to access the server;
determining whether the fingerprint feature database comprises the first fingerprint feature;
allowing, when the fingerprint feature database does not comprise the first fingerprint feature, the first access request packet to access the server;
disallowing, when the fingerprint feature database comprises the first fingerprint feature, the first access request packet to access the server;
allowing, when the first access request packet is allowed to access the server, the first access request packet to pass through; and
blocking, when the first access request packet is not allowed to access the server, the first access request packet.

15. The method according to claim 14, further comprising:
receiving an input comprising a transport-layer fingerprint feature and/or a network-layer fingerprint feature prior to receiving the first access request packet; and
storing the transport-layer fingerprint feature and/or the network-layer fingerprint feature in the fingerprint feature database.

16. The method according to claim 14, further comprising:
analyzing a third access request packet in an attack service model to obtain a transport-layer fingerprint feature and/or a network-layer fingerprint feature; and
storing the transport-layer fingerprint feature and/or the network-layer fingerprint feature in the fingerprint feature database.

17. The method according to claim 14, further comprising:
recognizing, based on the fingerprint feature database, the first OS type corresponding to the first fingerprint feature; and
determining, based on a first OS type list or a second OS type list, whether to allow the first access request packet to access the server, wherein the first OS type list comprises at least one of the second OS type that is allowed to access the server, and the second OS type list comprises at least one of the third OS type that is not allowed to access the server.

18. The method according to claim 14, wherein the first fingerprint feature and the second fingerprint feature in the fingerprint feature database are transport-layer fingerprint features, and wherein the transport-layer fingerprint features comprise one or more of the following:
option sorting information of a TCP option;
maximum segment size information or window size information;
window scale information; and
don't fragment (DF) flag bit information.

19. The method according to claim 14, wherein the first fingerprint feature and the second fingerprint feature in the fingerprint feature database are network-layer fingerprint features, and wherein the network-layer fingerprint features comprise one or more of the following:

time-to-live (TTL) information of an IP packet; and
IP header identification information.

20. The method according to claim 14, further comprising detecting the server is subject to a distributed denial-of-service (DDoS) attack prior to determining whether to allow the first access request packet to access the server.

\* \* \* \* \*

UNITED STATES PATENT AND TRADEMARK OFFICE
CERTIFICATE OF CORRECTION

PATENT NO. : 12,218,937 B2
APPLICATION NO. : 17/731893
DATED : February 4, 2025
INVENTOR(S) : Shiguang Li Page 1 of 1

It is certified that error appears in the above-identified patent and that said Letters Patent is hereby corrected as shown below:

In the Claims

Claim 7, Column 30, Line 58: "server; and" should read "server;"

Signed and Sealed this
First Day of April, 2025

Coke Morgan Stewart
*Acting Director of the United States Patent and Trademark Office*